(12) United States Patent  (10) Patent No.: US 9,794,452 B2
Nagano  (45) Date of Patent: Oct. 17, 2017

(54) IMAGE PROCESSING APPARATUS, IMAGE PROCESSING METHOD, AND PROGRAM

(71) Applicant: Sony Corporation, Tokyo (JP)

(72) Inventor: Hirosuke Nagano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/890,507

(22) PCT Filed: Apr. 3, 2014

(86) PCT No.: PCT/JP2014/059870
§ 371 (c)(1),
(2) Date: Nov. 11, 2015

(87) PCT Pub. No.: WO2014/188799
PCT Pub. Date: Nov. 27, 2014

(65) Prior Publication Data
US 2016/0080613 A1 Mar. 17, 2016

(30) Foreign Application Priority Data
May 22, 2013 (JP) ................................. 2013-108157

(51) Int. Cl.
*H04N 5/228* (2006.01)
*H04N 5/217* (2011.01)
(Continued)

(52) U.S. Cl.
CPC ............. *H04N 5/213* (2013.01); *G06T 5/002* (2013.01); *H04N 5/144* (2013.01); *H04N 5/21* (2013.01);
(Continued)

(58) Field of Classification Search
CPC .......... H04N 5/213; H04N 5/144; H04N 5/21; G06T 5/002; G06T 2207/10016; G06T 2207/20182; G06T 5/50; G06T 2207/20012; G06T 5/003
USPC .... 348/220.1, 241, 155, 208.13, 352, 415.1, 348/451, 452, 208.99, 208.1, 208.4, 41, 348/5.1; 382/107, 255, 264
See application file for complete search history.

(56) References Cited

U.S. PATENT DOCUMENTS 5,404,178 A 4/1995 Kondo et al.
2003/0122967 A1 7/2003 Kondo et al.
(Continued)

FOREIGN PATENT DOCUMENTS

JP 06-121192 A 4/1994
JP 06-121193 * 4/1994
(Continued)

*Primary Examiner* — Dennis Hogue
*Assistant Examiner* — Euel Cowan
(74) *Attorney, Agent, or Firm* — Wolf, Greenfield & Sacks, P.C.

(57) ABSTRACT

Noise is sufficiently reduced in a moving image.
A determination section determines, each time an input image is input, whether a change amount of a pixel value distribution in the input image and an output image that is output is smaller than a predetermined threshold value. A mixing ratio supply section supplies a value that becomes larger as the number of times the change amount is sequentially determined to be smaller than the predetermined threshold value becomes larger, the value serving as a mixing ratio of the output image in mixing of the input image and the output image. A mixing section mixes, each time the input image is input, the input image and the output image based on the supplied mixing ratio and outputs the input image and the output image to serve as a new output image.

9 Claims, 16 Drawing Sheets

(51) Int. Cl.
*H04N 5/213* (2006.01)
*H04N 5/21* (2006.01)
*G06T 5/00* (2006.01)
*H04N 5/14* (2006.01)

(52) U.S. Cl.
CPC ............... *G06T 2207/10016* (2013.01); *G06T 2207/20182* (2013.01)

(56) References Cited

U.S. PATENT DOCUMENTS

| | | | |
|---|---|---|---|
| 2005/0111751 A1* | 5/2005 | Avinash | G06T 5/20 382/275 |
| 2008/0151103 A1* | 6/2008 | Asamura | H04N 7/012 348/448 |
| 2008/0240617 A1* | 10/2008 | Douniwa | G06T 3/4007 382/300 |
| 2009/0059084 A1* | 3/2009 | Okada | G06T 3/4007 348/699 |
| 2009/0273541 A1* | 11/2009 | Miyoshi | G09G 5/00 345/3.2 |
| 2009/0317016 A1* | 12/2009 | Cho | G06K 9/40 382/264 |
| 2012/0257790 A1 | 10/2012 | Kobayashi et al. | |
| 2014/0029855 A1 | 1/2014 | Manako et al. | |

FOREIGN PATENT DOCUMENTS

| | | |
|---|---|---|
| JP | 06-121193 A | 4/1994 |
| JP | 2002-223374 A | 8/2002 |
| JP | 2010-004266 A | 1/2010 |

\* cited by examiner

| Frame number | Mixing ratio $\alpha$ (before limiting) | Count value CNTf | Upper limit value L | Mixing ratio $\alpha'$ (after limiting) |
|---|---|---|---|---|
| 0 | 0 | 0 | 0.5 | 0 |
| 1 | 0 | 0 | 0.5 | 0 |
| 2 | 0.97 | 1 | 0.67 | 0.67 |
| 3 | 0.97 | 2 | 0.75 | 0.75 |
| 4 | 0.97 | 3 | 0.80 | 0.80 |
| ... | ... | ... | ... | ... |
| 63 | 0.97 | 63 | 0.98 | 0.97 |

FIG.9

IMAGE PROCESSING APPARATUS, IMAGE PROCESSING METHOD, AND PROGRAM

TECHNICAL FIELD

The present technology relates to an image processing apparatus and an image processing method, and a program causing a computer to execute the method. Specifically, the present technology relates to an image processing apparatus and an image processing method with which noise of moving images is reduced, and a program causing a computer to execute the method.

BACKGROUND ART

In order to reduce noise mixed in moving images, there has been used from the past a technology called 3-dimensional noise reduction (3DNR). The 3DNR is a technology to reduce noise by mixing two two-dimensional (2D) frames that are continuous on a time axis. In the 3DNR, in general, each time an input frame is input, an image processing apparatus mixes an output frame previously output and the current input frame, to generate a current output frame. In this mixing, the following image processing apparatus is proposed: the previous output frame and the current input frame are compared with each other to obtain a motion amount, and as the motion amount becomes larger, a mixing ratio of the previous output frame is made lower (see, for example, Patent Document 1).

Patent Document 1: Japanese Patent Application Laid-open No. 2010-4266

SUMMARY OF INVENTION

Problem to be Solved by the Invention

In the related art described above, however, there is a possibility that the noise cannot be sufficiently reduced. Namely, since the image processing apparatus described above determines the mixing ratio according to the motion amount, when a state where the motion amount is constant is continued, each of the output frames is mixed according to the constant mixing ratio. When the mixing ratio is constant over a plurality of input frames, there is a possibility that those input frames are not mixed with the output frames at an equal ratio.

For example, when continuous input frames F1, F2, and F3 are input in chronological order, and the mixing ratio of output frames is a constant value $\alpha$, the input frame F1 is first output to serve as an output frame F1' without change. Next, the previous output frame F1' (i.e., input frame F1) having a ratio of $\alpha$ and the input frame F2 having a ratio of $(1-\alpha)$ are mixed, to output an output frame F2'. The previous output frame F2' having a ratio of $\alpha$ and the input frame F3 having a ratio of $(1-\alpha)$ are then mixed, to output an output frame F3'. Since the ratio of the input frames F1 and F2 in the output frame F2' is $\alpha:(1-\alpha)$, the ratio of the input frames F1, F2, and F3 in the output frame F3' is $\alpha^2:\alpha(1-\alpha):(1-\alpha)$. For the mixing ratio $\alpha$, a value smaller than "1" is generally set, and thus older input frames have smaller ratios in the output frame. Therefore, there is a possibility that when the mixing ratio is constant, the noise cannot be sufficiently reduced.

Further, when intensive motions occur in a moving image, there is a possibility that a difference in ratio between the input frames in the output frame is increased. For example, it is conceived a case where a change between the input frames F1 and F2 is large, and the next input frame F3 and frames subsequent thereto have small changes between adjacent frames. In the case, since the change between the input frames F1 and F2 is large, in the mixing of the input frames F1 and F2, the input frame F1 is mixed at a high mixing ratio $\alpha$. In contrast to this, the input frame F2 and the input frames subsequent thereto have small changes between adjacent frames and are mixed at a lower mixing ratio. As a result, the input frame F1 is mixed at a higher ratio than the input frames subsequent to the input frame F1, and a noise reducing effect is lost.

The present technology has been made in view of the circumstances as described above, and it is an object of the present technology to sufficiently reduce noise in a moving image.

Means for Solving the Problem

The present technology has been made in order to eliminate the problems described above. According to a first aspect of the present technology, there is provided an image processing apparatus, an image processing method, and a program causing a computer to execute the image processing method. The image processing apparatus includes: a determination section that determines, each time an input image is input, whether a change amount of a pixel value distribution in the input image and an output image that is output is smaller than a predetermined threshold value; a mixing ratio supply section that supplies a value that becomes larger as the number of times the change amount is sequentially determined to be smaller than the predetermined threshold value becomes larger, the value serving as a mixing ratio of the output image in mixing of the input image and the output image; and a mixing section that mixes, each time the input image is input, the input image and the output image based on the supplied mixing ratio and outputs the input image and the output image to serve as a new output image. Thus, the following action is caused: the input image and the output image are mixed at a mixing ratio that becomes larger as the number of times the change amount is sequentially determined to be smaller than the predetermined threshold value becomes larger.

Further, in the first aspect, the mixing ratio supply section may include an upper limit value generation section that generates an upper limit value that becomes larger as the number of times becomes larger, an acquisition section that acquires a value that becomes smaller as the change amount becomes larger, and a limitation section that supplies, when the acquired value is larger than the upper limit value, the upper limit value to serve as the mixing ratio, and supplies, when the acquired value does not exceed the upper limit value, the acquired value to serve as the mixing ratio. Thus, the following action is caused: a value limited by the upper limit value that becomes larger as the number of times becomes larger is supplied to serve as the mixing ratio.

Further, in the first aspect, the mixing ratio supply section may supply the mixing ratio that becomes larger as the number of times becomes larger and at which a proportion of each of the input images mixed in the output image is made uniform. Thus, the following action is caused: the mixing ratio that becomes larger as the number of times becomes larger and at which a proportion of each of input images mixed in the output image is made uniform is supplied.

Further, in the first aspect, each of the input image and the output image may be an image including a plurality of areas each including a plurality of pixels, the determination section may determine, per area, whether the change amount is smaller than the predetermined threshold value, and the mixing ratio supply section may acquire, per area, the number of times the change amount is sequentially determined to be smaller than the predetermined threshold value, and supply the mixing ratio that becomes larger as a minimum value of the numbers of times acquired per area becomes larger. Thus, the following action is caused: a larger mixing ratio is supplied as a minimum value of the numbers of times per area the change amount is sequentially determined to be smaller than the predetermined threshold value becomes larger.

Further, in the first aspect, each of the input image and the output image may be an image including a plurality of pixels, the determination section may determine, per pixel, whether the change amount is smaller than the predetermined threshold value, and the mixing ratio supply section may acquire, per pixel, the number of times the change amount is sequentially determined to be smaller than the predetermined threshold value, and supply the mixing ratio that becomes larger as a minimum value of the numbers of times acquired per pixel becomes larger. Thus, the following action is caused: a larger mixing ratio is supplied as a minimum value of the numbers of times per pixel the change amount is sequentially determined to be smaller than the predetermined threshold value becomes larger.

Further, in the first aspect, the image processing apparatus may further include: a replacement section that replaces, when the pixel includes invalid data together with valid data indicating a pixel value, the invalid data not applying to the valid data, the invalid data within the pixel per pixel based on the number of times; and an image holding section that holds the output image in which the invalid data is replaced, in which the mixing ratio supply section may acquire the number of times from the held output image. Thus, the following action is caused: the number of times is acquired from the output image in which the invalid data is replaced.

Further, according to a second aspect of the present technology, there is provided an imaging apparatus including: a determination section that determines, each time an input image is input, whether a change amount of a pixel value distribution in the input image and an output image that is output is smaller than a predetermined threshold value; a mixing ratio supply section that supplies a value that becomes larger as the number of times the change amount is sequentially determined to be smaller than the predetermined threshold value becomes larger, the value serving as a mixing ratio of the output image in mixing of the input image and the output image; a mixing section that mixes, each time the input image is input, the input image and the output image based on the supplied mixing ratio and outputs the input image and the output image to serve as a new output image; and an image holding section that holds the output image that is output. Thus, the following action is caused: the input image and the output image are mixed at a mixing ratio that becomes larger as the number of times the change amount is sequentially determined to be smaller than the predetermined threshold value becomes larger.

Effect of the Invention

According to the present technology, it is possible to produce an excellent effect in which noise can be sufficiently reduced in a moving image.

BRIEF DESCRIPTION OF DRAWINGS

FIG. 9 is a diagram showing an example of the count value, the limit value, and the mixing ratio in the first embodiment.

MODE(S) FOR CARRYING OUT THE INVENTION

Hereinafter, forms for carrying out the present technology (hereinafter, called embodiments) will be described. It should be noted that the description is provided in the following order.
1. First Embodiment (Example of mixing at larger mixing ratio in larger count value)
2. Second Embodiment (Example of mixing at larger mixing ratio as minimum value of count values per pixel and of the entire image is larger)
3. Third Embodiment (Example of mixing at larger mixing ratio as minimum value of count values per pixel and per area is larger)

4. Fourth Embodiment (Example of mixing at larger mixing ratio as minimum value of count values of the entire image, per pixel, and per area is larger)

<1. First Embodiment>

[Configuration Example of Imaging Apparatus]

Figure 1:
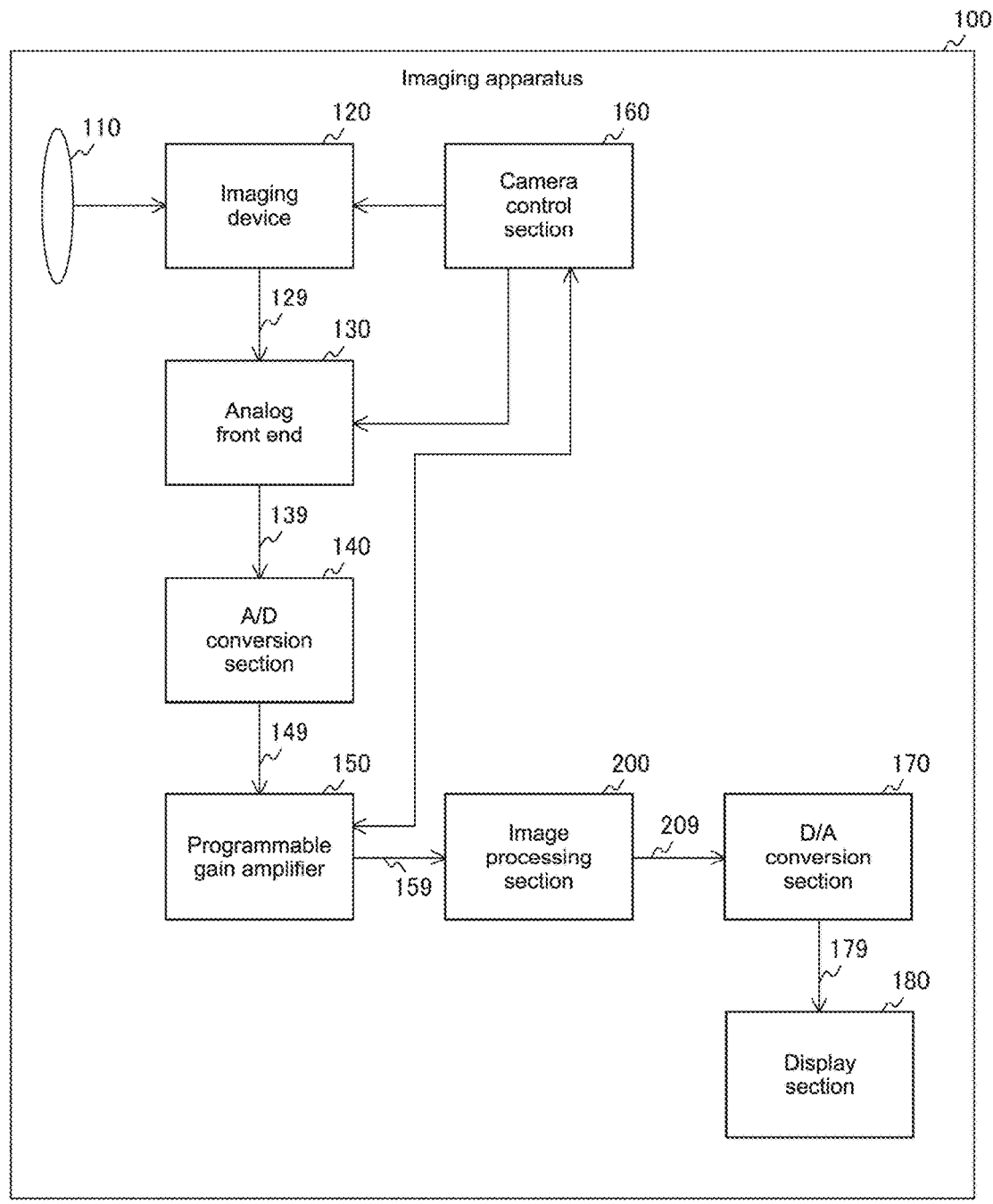
FIG. 1 is a block diagram showing a configuration example of an imaging apparatus in a first embodiment.

FIG. 1 is a block diagram showing a configuration example of an imaging apparatus 100 in a first embodiment of the present technology. The imaging apparatus 100 is an apparatus that captures images, and includes an imaging lens 110, an imaging device 120, an analog front end 130, an A/D conversion section 140, a programmable gain amplifier 150, and a camera control section 160. Further, the imaging apparatus 100 includes an image processing section 200, a D/A conversion section 170, and a display section 180.

The imaging lens 110 is a lens for forming an image of an imaging target on the imaging device 120. The imaging lens 110 includes lenses such as a focus lens and a zoom lens.

The imaging device 120 photoelectrically converts light from the imaging lens 110 and supplies a converted electric signal, which serves as an image signal, to the analog front end 130 via a signal line 129. The imaging device 120 can be achieved by a CCD (Charge Coupled Device) or CMOS (Complementary Metal Oxide Semiconductor) sensor or the like.

The analog front end 130 performs processing, such as noise removing processing and amplification processing, on the analog image signal and supplies the resultant signal to the A/D conversion section 140 via a signal line 139. The analog front end 130 includes, for example, a correlated double sampling (CDS) circuit, and removes noise by that CDS circuit.

The A/D conversion section 140 converts the analog image signal into digital image data and supplies the digital image data to the programmable gain amplifier 150 via a signal line 149. The image data includes pieces of pixel data, each of which indicates a pixel value of each pixel. It should be noted that the A/D conversion section 140 is configured to be provided on the outside of the analog front end 130, but the A/D conversion section 140 may be provided inside the analog front end 130.

The programmable gain amplifier 150 amplifies the pixel value of each pixel in the image data according to the control of the camera control section 160. The programmable gain amplifier 150 supplies the amplified image data to the image processing section 200 via a signal line 159.

The image processing section 200 performs 3DNR on a moving image formed of the pieces of image data. The pieces of image data are input, as input frames, to the image processing section 200 in chronological order. Each time the input frame is input, the image processing section 200 outputs image data, which is obtained by mixing the current input frame and a previous output frame to serve as a current output frame, to the D/A conversion section 170 via a signal line 209. When the first input frame is input, a previous output frame is not present, and thus the input frame is output as an output frame without change. The image processing section 200 mixes two frames that are continuous in chronological order, to thus remove noise in the moving image.

It should be noted that the image processing section 200 can further perform image processing such as demosaic processing, white balance processing, and gamma correction processing, in addition to 3DNR. The order in which those processing are performed is arbitrarily set.

The camera control section 160 controls the entire imaging apparatus 100. According to an operation of a user (a press of a start button etc.), the camera control section 160 controls the imaging device 120 and the analog front end 130 to start generating a plurality of image signals. Those image signals are generated in preset constant cycles (for example, 1/60 seconds). According to an operation of the user (a press of an end button etc.), the camera control section 160 terminates the generation of the image signals. Further, the camera control section 160 controls an amplification factor of the pixel values in the programmable gain amplifier 150 to be a preset value.

The D/A conversion section 170 converts the digital image data into analog image signals and supplies the analog image signals to the display section 180 via a signal line 179. The display section 180 displays an image based on the image signals.

It should be noted that the imaging apparatus 100 can further include a recording section that records the image data in a recording medium such as a memory.

[Configuration Example of Image Processing Unit]

Figure 2:
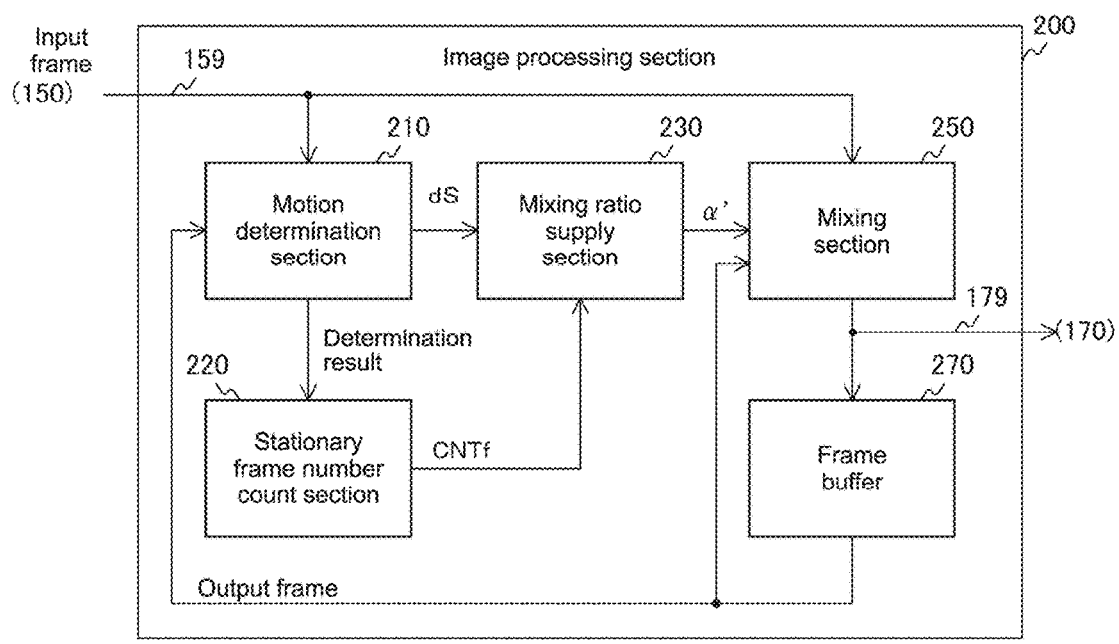
FIG. 2 is a block diagram showing a configuration example of an image processing section in the first embodiment.

FIG. 2 is a block diagram showing a configuration example of the image processing section 200 in the first embodiment. The image processing section 200 includes a motion determination section 210, a stationary frame number count section 220, a mixing ratio supply section 230, a mixing section 250, and a frame buffer 270.

Each time the input frame is input, the motion determination section 210 compares a previous output frame and the current input frame and determines the presence or absence of a motion. In the determination on the presence or absence of a motion, the motion determination section 210 first reads the previous output frame from the frame buffer 270 and obtains as a motion amount dS a change amount of a pixel value distribution of that output frame and the current input frame. For example, the motion determination section 210 obtains differences in pixel values between pixels having the same coordinates in the output frame and the input frame. The motion determination section 210 then calculates statistics of those differences (for example, mean value) to serve as a motion amount dS.

After obtaining the motion amount dS, the motion determination section 210 determines that there is no motion when the motion amount dS is smaller than a predetermined threshold value Th_f, and determines that there is a motion when the motion amount dS is equal to or larger than the threshold value Th_f. The motion determination section 210 supplies the motion amount dS to the mixing ratio supply section 230 and supplies a determination result on the presence or absence of a motion to the stationary frame number count section 220. In such a manner, an approach to obtain a motion from the differences in pixel values between the frames is called an inter-frame difference method.

It should be noted that the motion determination section 210 is an example of a determination section described in the Claims. Further, the motion determination section 210 can determines the presence or absence of a motion by using an approach other than the inter-frame difference method. For example, the motion determination section 210 may determine the presence or absence of a motion by using a block matching algorithm.

When the block matching algorithm is used, each of the input frame and the output frame is handled as an image formed of a plurality of blocks each having a predetermined shape (for example, square of 8×8 pixels). The motion determination section 210 obtains two blocks having a high correlation in the input frame and the output frame, generates a vector from one of the blocks to the other block to serve as a motion vector, and calculates the magnitude of the vector to serve as a motion amount dS. In the block matching algorithm, a motion amount is calculated for each block within the frame, and thus those statistics (for example, mean value) are output to serve as the motion amount dS of the entire screen.

The stationary frame number count section 220 counts the number of times no motion is sequentially determined, and generates a counted value to serve as a count value CNTf. The stationary frame number count section 220 holds the count value CNTf. The stationary frame number count section 220 increments the count value CNTf when it is determined that there is no motion, and sets the count value CNTf to be an initial value (for example, "0") when it is determined that there is a motion. The stationary frame number count section 220 supplies the count value CNTf to the mixing ratio supply section 230.

It should be noted that the stationary frame number count section 220 increments the count value CNTf, but an incremental value is not limited to "1". Further, the stationary frame number count section 220 increments the count value CNTf when there is no motion, but the stationary frame number count section 220 may be a down counter that decrements the count value CNTf when there is no motion.

The mixing ratio supply section 230 supplies a mixing ratio α' in which the proportion of an output image is made higher as the number of times no motion is sequentially determined (i.e., count value CNTf) becomes larger. For example, the mixing ratio supply section 230 generates a larger mixing ratio α as the motion amount dS becomes smaller, and generates a lager upper limit value L as the count value CNTf becomes larger. The mixing ratio supply section 230 then limits the mixing ratio α so as not to exceed the upper limit value L and sets a limited value to be the mixing ratio α'. Here, the mixing ratios α and α' are each a value indicating the proportion of the output frame in the mixing of the input frame and the output frame, and for example, real numbers of 0 to 1 is set therefor. The mixing ratio supply section 230 supplies the set mixing ratio α' to the mixing section 250.

The mixing section 250 mixes the previous output frame and the current input frame based on the mixing ratio α'. Each time the input frame is input, the mixing section 250 reads the previous output frame from the frame buffer 270 and mixes that output frame and the current input frame based on the mixing ratio α'. Specifically, the mixing section 250 mixes the frames by using the following expression. It should be noted that when the first input frame is input, a previous output frame is not present, and thus the mixing ratio α' is set to "0".

$$Y_t(x,y) = \alpha_t' \times Y_{t-1}(x,y) + (1-\alpha_t') \times X_t(x,y) \qquad \text{Expression 1}$$

In the above expression, $Y_t(x,y)$ and $Y_{t-1}(x,y)$ are pixel values of pixels having coordinates (x,y) in the t-th and (t−1)-th output frames. x is a horizontal coordinate in the frame, and y is a vertical coordinate. Here, the number of pixels in the horizontal direction of the frame is M (M is an integer), and x is a value of 0 to M−1. Further, the number of pixels in the vertical direction of the frame is N (N is an integer), and y is a value of 0 to N−1. $X_t(x,y)$ is a pixel value of a pixel having coordinates (x,y) in the t-th input frame. $\alpha_t'$ is a mixing ratio that is set t-th.

In the filter expressed by the expression 1, an output signal (i.e., output frame) is fed back, and thus a value that is not zero is output with respect to an impulse over an unlimited period of time. Therefore, such a filter is called an infinite impulse response (IIR) filter.

The mixing section 250 outputs the generated current output frame to the D/A conversion section 170 and also causes the frame buffer 270 to hold the generated current output frame. The frame buffer 270 holds the output frame. It should be noted that the frame buffer 270 is an example of an image holding section described in the Claims.

[Configuration Example of Mixing Ratio Supply Unit]

Figure 3:
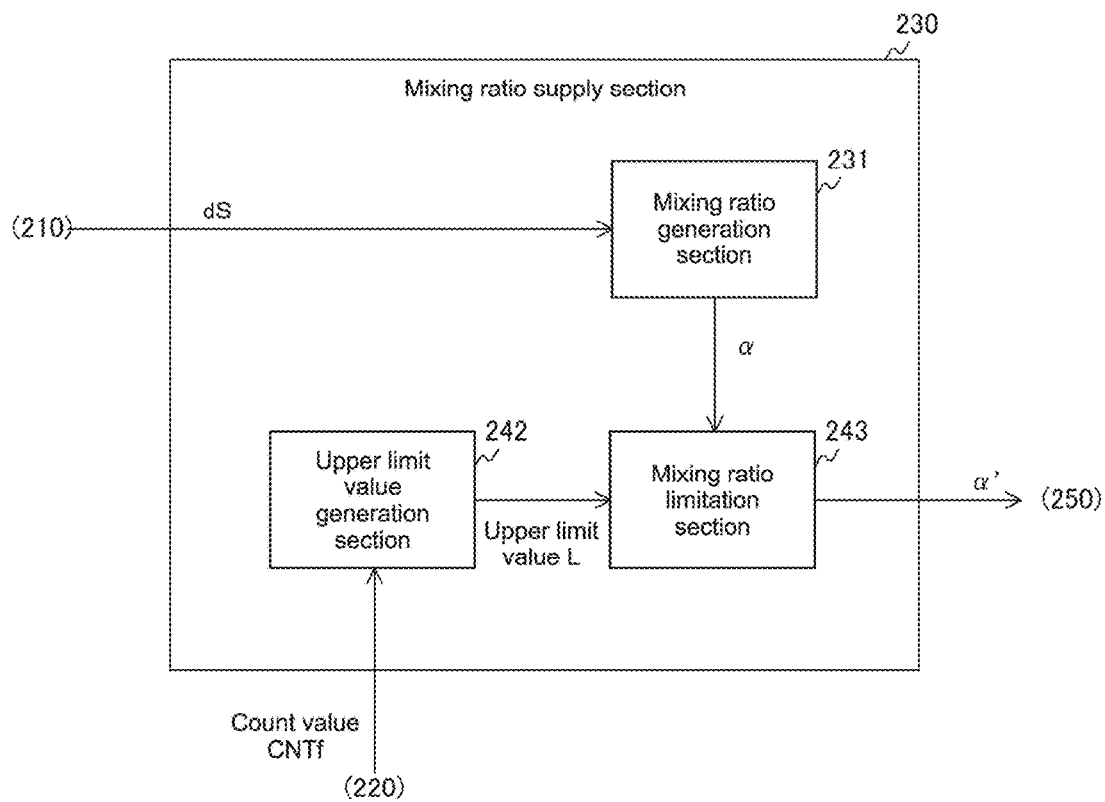
FIG. 3 is a block diagram showing a configuration example of a mixing ratio supply section in the first embodiment.

FIG. 3 is a block diagram showing a configuration example of the mixing ratio supply section 230 in the first embodiment. The mixing ratio supply section 230 includes a mixing ratio generation section 231, an upper limit value generation section 242, and a mixing ratio limitation section 243.

The mixing ratio generation section 231 generates a larger mixing ratio α as the motion amount dS becomes smaller. The mixing ratio generation section 231 generates the mixing ratio α by using a function expressed by the following expression, for example.

[Math. 1]

$$\alpha = \begin{cases} \alpha_{max} & (dS < \text{Th\_s}) \\ -a \times dS + b & (dS \geq \text{Th\_s}) \end{cases} \qquad \text{Expression 2}$$

In the above expression, a and b are each a positive real number. $\alpha_{max}$ is the upper limit value of the mixing ratio α, and a real number that is larger than "0" and smaller than "1" is set therefor. Th_s is a threshold value of the motion amount dS. The Th_s is set to, for example, the same value as the threshold value Th_f used for the determination on the presence or absence of a motion. It should be noted that those threshold values may be set to different values.

It should be noted that the mixing ratio generation section 231 may obtain the mixing ratio α by an expression other than Expression 2 as long as a larger mixing ratio α can be generated as the motion amount dS becomes smaller. Further, the mixing ratio generation section 231 obtains the mixing ratio α by a computation, but the mixing ratio generation section 231 is not limited to this configuration. For example, the mixing ratio generation section 231 may be configured to include a table in which the mixing ratio α obtained in advance from Expression 2 or the like and the motion amount dS are associated with each other, and read the mixing ratio α corresponding to the motion amount dS from that table. Alternatively, if the motion amount dS is equal to or larger than the threshold value Th_s, the mixing ratio generation section 231 may return the value of "0", and if not, the mixing ratio generation section 231 may use a function for returning the $\alpha_{max}$, to generate a mixing ratio α without performing a computation. It should be noted that the mixing ratio generation section 231 is an example of an acquisition section described in the Claims.

The upper limit value generation section 242 generates the upper limit value L from the count value CNTf. The upper limit value generation section 242 calculates the upper limit value L by using the following expression, for example, and supplies the upper limit value L to the mixing ratio limitation section 243.

$$L = (CNTf+1)/(CNTf+2) \qquad \text{Expression 3}$$

It should be noted that the upper limit value generation section 242 may obtain the upper limit value L by an expression other than Expression 3 as long as a smaller upper limit value L can be generated as the count value CNTf becomes larger. Further, the upper limit value generation section 242 obtains the upper limit value L by a computation, but the upper limit value generation section 242 is not limited to this configuration. For example, the upper limit value generation section 242 may be configured to include a table in which the upper limit value L obtained in advance from Expression 3 or the like and the count value CNTf are associated with each other, and read the upper limit value L corresponding to the count value CNTf from that table.

The mixing ratio limitation section 243 limits the mixing ratio α so as not to exceed the upper limit value L. When the mixing ratio α is equal to or larger than the upper limit value L, the mixing ratio limitation section 243 outputs to the mixing section 250 the upper limit value L to serve as a limited mixing ratio α'. On the other hand, when the mixing ratio α is smaller than the upper limit value L, the mixing ratio limitation section 243 outputs to the mixing section 250 the mixing ratio α, without change, to serve as the mixing ratio α'.

It should be noted that the mixing ratio supply section 230 supplies the mixing ratio α' of the output frame, but the mixing ratio supply section 230 may supply a mixing ratio (1−α') of the input frame instead of α'. In the case, the mixing ratio generation section 231 generates a lager mixing ratio (1−α) as the motion amount dS becomes larger. Further, the upper limit value generation section 242 generates a lower limit value that becomes larger as the count value CNTf becomes larger. The mixing ratio limitation section 243 then limits the mixing ratio (1−α) so as not to be smaller than the lower limit value.

Figure 4:
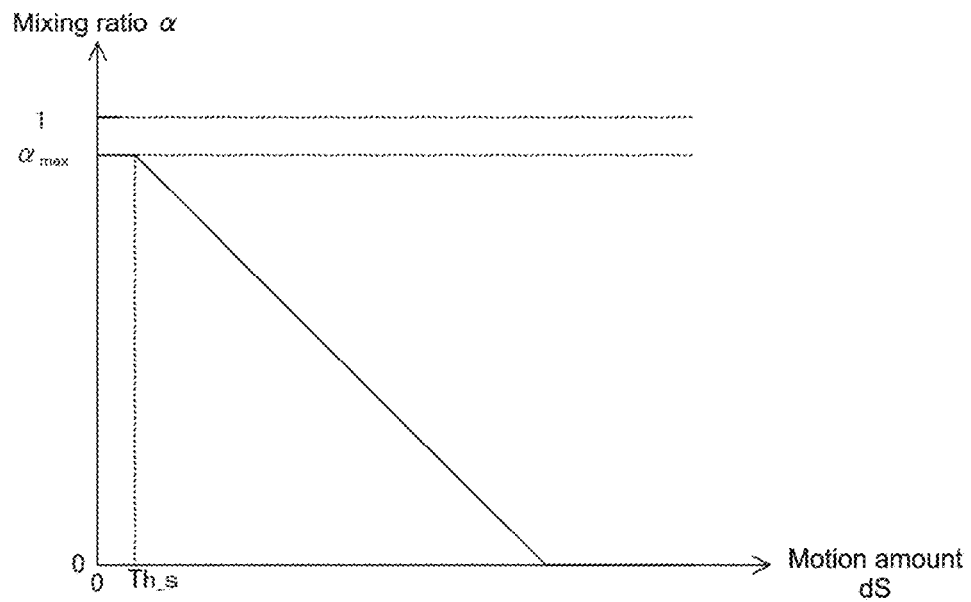
FIG. 4 is a graph showing an example of a mixing ratio corresponding to a motion amount in the first embodiment.

FIG. 4 is a graph showing an example of the mixing ratio α corresponding to the motion amount dS in the first embodiment. As exemplified in the figure, a smaller mixing ratio α is generated as the motion amount dS becomes larger. Further, when the motion amount dS is smaller than the threshold value Th_s, the mixing ratio $\alpha_{max}$ of the upper limit is generated.

Figure 5:
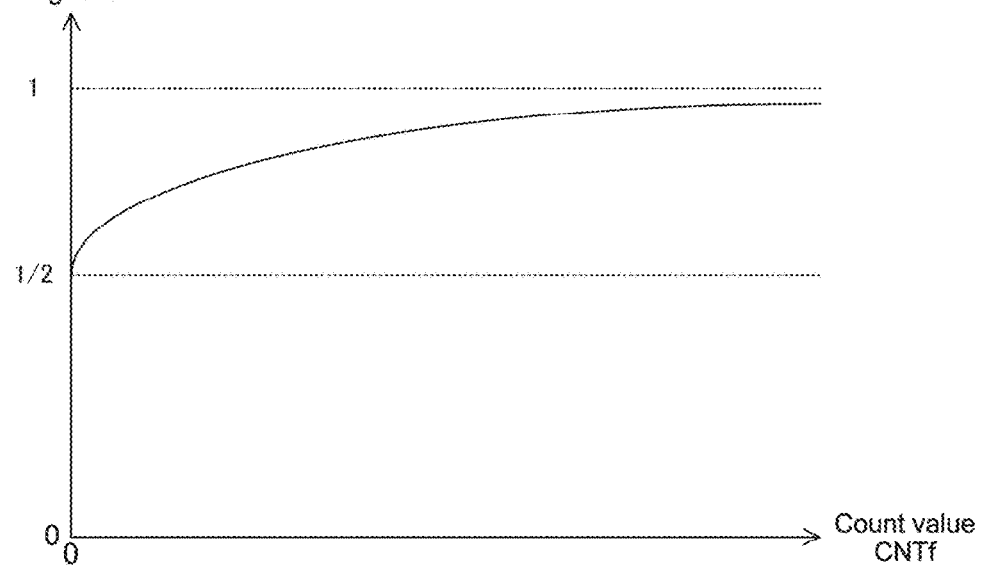
FIG. 5 is a graph showing an example of a limit value corresponding to a count value in the first embodiment.

FIG. 5 is a graph showing an example of the upper limit value L corresponding to the count value CNTf in the first embodiment. As exemplified in the figure, a lager upper limit value L is generated as the count value CNTf becomes larger.

[Configuration Example of Mixing Unit]

Figure 6:
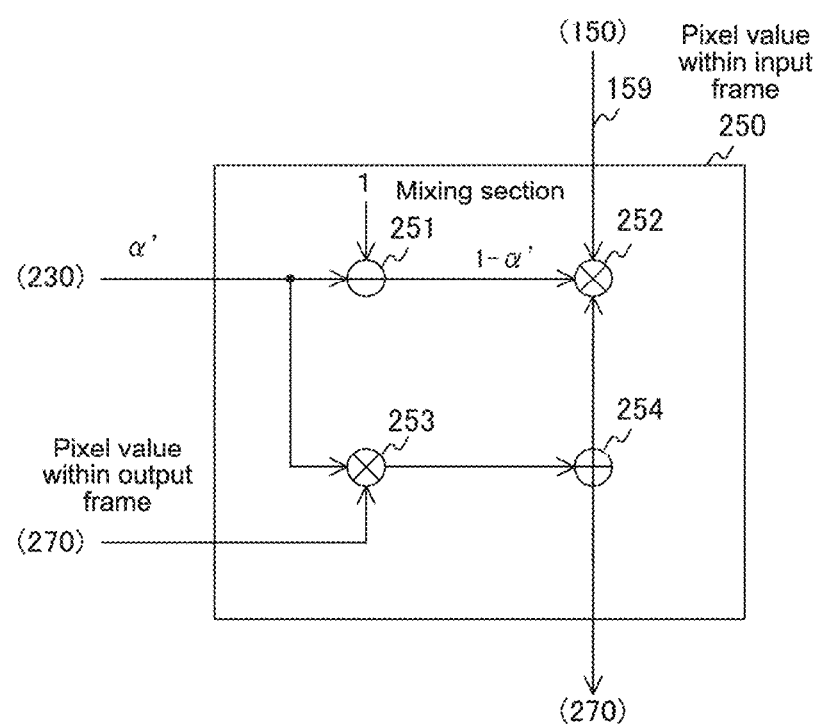
FIG. 6 is a block diagram showing a configuration example of a mixing section in the first embodiment.

FIG. 6 is a block diagram showing a configuration example of the mixing section 250 in the first embodiment. The mixing section 250 includes a subtractor 251, multipliers 252 and 253, and an adder 254.

The subtractor 251 subtracts one of two input values from the other input value. A value of "1" and the mixing ratio α' are input to the subtractor 251. The subtractor 251 subtracts the mixing ratio α' from "1" and supplies a subtraction result (1−α') to the multiplier 252.

Each of the multipliers 252 and 253 multiplies two input values. The (1−α') and a pixel value of a pixel within the input frame are input to the multiplier 252. One input frame includes a plurality of (for example, M×N) pixel values, and those pixel values are sequentially input in a predetermined order. Each time the pixel value is input, the multiplier 252 multiplies that pixel value and (1−α') together and supplies a multiplication result to the adder 254.

The mixing ratio α' and a pixel value of a pixel within the output frame read from the frame buffer 270 are input to the multiplier 253. Each time a pixel value is input, the multiplier 253 multiplies that pixel value and the mixing ratio α' together and supplies a multiplication result to the adder 254.

The adder 254 adds two input values. The adder 254 adds the multiplication result of the multiplier 252 and the multiplication result of the multiplier 253 and supplies to the frame buffer 270 an addition result to serve as a pixel value of the output frame.

[Example of Operation of Imaging Apparatus]

Figure 7:
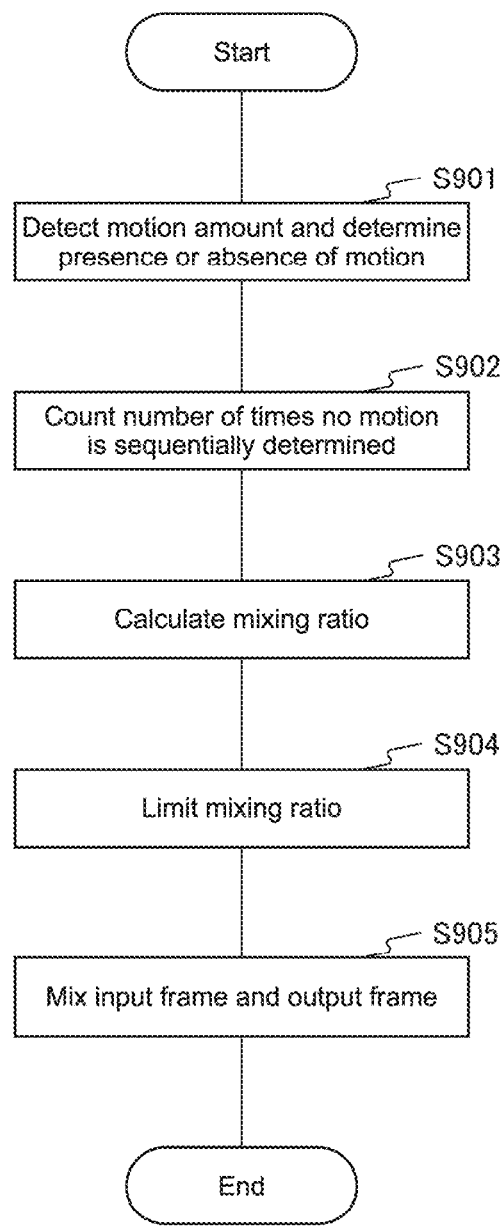
FIG. 7 is a flowchart showing an example of image processing executed by the image processing section 200 in the first embodiment.

FIG. 7 is a flowchart showing an example of image processing executed by the image processing section 200 in the first embodiment. The image processing is executed each time an input frame within a moving image is input to the image processing section 200, for example. The image processing section 200 detects the motion amount dS from a current input frame and a previous output frame and determines the presence or absence of a motion (Step S901).

The image processing section 200 counts the number of times no motion is sequentially determined and generates the count value CNTf (Step S902). The image processing section 200 generates the mixing ratio α from the motion amount dS (Step S903). The image processing section 200 then generates the upper limit value L from the count value CNTf and limits the mixing ratio α by that upper limit value L (Step S904).

The image processing section 200 mixes the input frame and the output frame based on the limited mixing ratio α' for output (Step S905). After Step S905, the image processing section 200 terminates the image processing.

Figure 8:
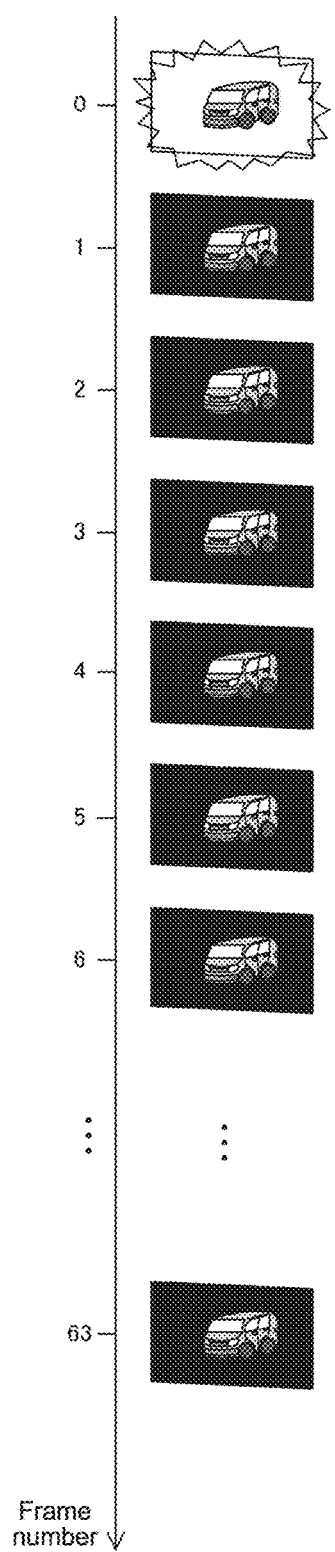
FIG. 8 is a diagram showing an example of a moving image to be processed in the first embodiment.

FIG. 8 is a diagram showing an example of a moving image to be processed in the first embodiment. As exemplified in the figure, the moving image includes 64 input frames having frame numbers "0" to "63". It is assumed that the input frame having the frame number "0" is generated with the flash on and the luminance of that frame is high as a whole. Further, it is assumed that the input frames having the frame numbers "0" to "63" each have a lower luminance than the frame number "0", and a change amount of a luminance distribution between adjacent frames is small.

FIG. 9 is a diagram showing an example of the count value, the upper limit value, and the mixing ratio in the first embodiment. Here, it is assumed that the moving image of FIG. 8 is input. Since a previous output frame is not present at the time the input frame having the frame number "0" is input, the mixing ratio α' is set to "0".

Next, at the time the input frame having the frame number "1" is input, the motion amount dS of the current input frame with respect to the previous output frame is large. Thus, the mixing ratio α is set to "0". The same holds true for the limited mixing ratio α'.

At the time the input frame having the frame number "2" is input, the motion amount dS of the current input frame with respect to the previous output frame is small. Thus, the mixing ratio α is set to a relatively large "0.97". The number of times no motion is sequentially determined is once, and thus the upper limit value L is set to approximately "0.67" by Expression 3. Therefore, the limited mixing ratio α' is "0.67".

Since the motion amount dS is small also after the frame number "3", a relatively large mixing ratio α is set. It should be noted that the upper limit value L becomes larger as the number of times no motion is sequentially determined (i.e., count value CNTf) is increased, based on Expression 3, and the limited mixing ratio α' also becomes larger.

In such a manner, a larger mixing ratio α' is set as the number of times no motion is sequentially determined becomes larger.

Figure 10:
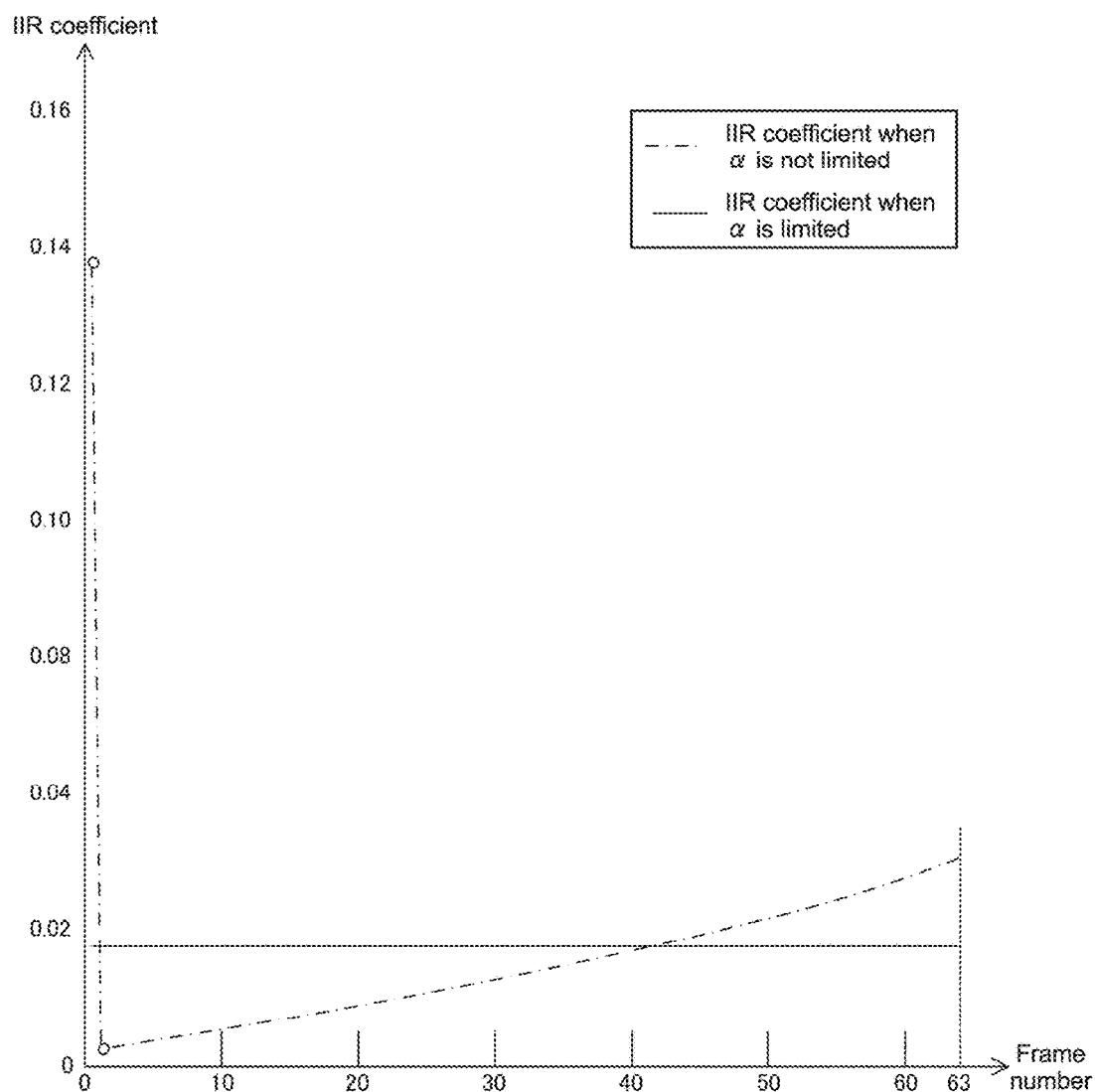
FIG. 10 is a graph showing an example of an IIR coefficient in the first embodiment.

FIG. 10 is a graph showing an example of an IIR coefficient in the first embodiment. In the figure, the vertical axis represents an IIR coefficient, and the horizontal axis represents a frame number. Here, the IIR coefficient is a coefficient indicating a proportion of each input frame in the output frame. The IIR coefficient is expressed by the following expressions 4 to 7, for example.

[Math. 2] Expression 4
$$Y_n = \alpha_1 \times \alpha_2 \times \cdots \alpha_n \times X_0 + (1-\alpha_1) \times \alpha_2 \times \cdots \alpha_n \times X_1 + \cdots + (1-\alpha_{n-1}) \times \alpha_n \times X_{n-1} + (1-\alpha_n) \times X_n = a_0 X_0 + b_1 X_2 + \cdots + b_{n-1} \times X_{n-1} + c_n X_n$$

[Math. 3] Expression 5
$$a_0 = \alpha_1 \times \alpha_2 \times \cdots \times \alpha_n$$

[Math. 4] Expression 6
$$b_k = (1-\alpha_k) \prod_{l=k+1}^{n} \alpha_l$$

[Math. 5] Expression 7
$$c_n = (1-\alpha_n)$$

In Expression 4, $Y_n$ is a pixel value of a pixel in the n-th output frame. $\alpha_0$ to $\alpha_n$ are mixing ratios that are set 0th to n-th. $X_0$ to $X_n$ are pixel values of pixels of the 0th to n-th input frames. $a_0$ is an IIR coefficient indicating a proportion of the 0th input frame. $b_k$ (k is an integer of 1 to n−1) is an IIR coefficient indicating a proportion of the k-th input frame. $c_n$ is an IIR coefficient indicating a proportion of the n-th input frame. In Expression 6, $\Pi_{\alpha l}$ (l is an integer of k+1 to n) indicates an infinite product of $\alpha_l$. It should be noted that the description of the coordinates of the pixels is omitted in Expressions 4 to 7. The description of the coordinates of the pixels is similarly omitted also in expressions after Expression 7.

A method of deriving Expression 4 will be described. When mixing is performed at the mixing ratio $\alpha$, a pixel value $Y_1$ of the 1st output frame is expressed by the following expression based on Expression 1.

$$Y_1 = \alpha_1 \times Y_0 + (1-\alpha_1) \times X_1$$
$$= \alpha_1 \times X_0 + (1-\alpha_1) \times X_1$$
Expression 8

A pixel value $Y_2$ of the 2nd output frame is expressed by the following expression based on Expression 8 above and Expression 1.

$$Y_1 = \alpha_2 \times Y_1 + (1-\alpha_2) \times X_2$$
$$= \alpha_2 \times (\alpha_1 \times X_0 + (1-\alpha_1) \times X_1) + (1-\alpha_2) \times X_2$$
$$= \alpha_1 \times \alpha_2 \times X_0 + (1-\alpha_1) \times \alpha_2 \times X_1 + (1-\alpha_2) \times X_2$$
Expression 9

As exemplified in Expressions 8 and 9, the pixel value of the output frame in each output frame subsequent to the 1st output frame can be expressed by a sum of weighted values of the pixel values of the plurality of input frames. Similarly in Expressions 8 and 9, in the n-th output frame, when all the output frames are replaced with the input frames by a convolution operation in which the function exemplified by Expression 1 is sequentially convoluted with respect to each pixel value of the output frames before the (n−1)-th output frame, Expression 4 is derived.

Here, as exemplified in FIG. 8, a case is conceived in which, in the 64 frames, there is a motion between the 0th and the 1st input frames and there is no motion in the 2nd and subsequent frames. In this case, for example, the mixing ratio $\alpha_0$ of "0" is generated, and the mixing ratios $\alpha_1$ to $\alpha_{63}$ of "31/32" ($\approx 0.97$) are generated. When those values are substituted into Expression 5, an IIR coefficient $a_0$ of "0" is acquired.

Further, an IIR coefficient $b_1$ is $(31/32)^{62}$ ($\approx 0.139$) from Expression 6. An IIR coefficient $b_2$ is $(1-31/32) \times (31/32)^{61}$ ($\approx 0.005$). After that, based on Expressions 6 and 7, a larger IIR coefficient is acquired as the frame number is increased. As a result, a trajectory of an alternate long and short dash line in FIG. 10 is acquired. When the mixing ratio $\alpha$ is not limited, the trajectory indicates that the IIR coefficient, that is, the proportion of the input frame is not made uniform. Further, when there is a motion in the 1st input frame, the IIR coefficient $b_1$ at that time becomes extremely larger than the other IIR coefficients ($b_2$ etc.). Therefore, when mixing is performed at the mixing ratio $\alpha$ before the limiting, a noise reducing effect is lost.

In contrast to this, when the mixing ratio $\alpha$ is limited by the upper limit value L, a uniform IIR coefficient is acquired. For example, IIR coefficients $b_k$ and $b_{k+1}$ are expressed by the following Expressions 10 and 11 based on Expression 6.

$$b_k = (1-\alpha_k) \times \alpha_{k+1} \times \alpha_{k+2} \times \ldots \times \alpha_n$$
Expression 10

$$b_{k+1} = (1-\alpha_{k+1}) \times \alpha_{k+2} \times \ldots \times \alpha_n$$
Expression 11

From those Expressions 10 and 11, a relationship indicated by the following expression is acquired.

$$b_k = \{(1-\alpha_k) \times \alpha_{k+1}/(1-\alpha_{k+1})\} \times b_{k+1}$$
Expression 12

Here, it is assumed that the mixing ratios $\alpha_k$ and $\alpha_{k+1}$ limited by the upper limit value L are equal to the upper limit value L. In this case, assuming from Expression 3 that the limited $\alpha_k$ is (CNTf+1)/(CNTf+2), the limited $\alpha_{k+1}$ is (CNTf+2)/(CNTf+3). When those are substituted into Expression 12, a value of $(1-\alpha_k) \times \alpha_k/(1-\alpha_{k+1})$ is "1" in Expression 12. Therefore, $b_k = b_{k+1}$ is established. Consequently, when mixing is performed by the mixing ratio $\alpha$ limited by the upper limit value L, the IIR coefficient is made uniform.

In the actual practice in FIG. 10, the mixing is performed under an ideal condition in which the IIR coefficient, that is, the proportion of the input frame is uniform, as shown in FIG. 10 showing the IIR coefficient of the case where the mixing ratio $\alpha$ is limited. Thus, noise within the moving image is sufficiently removed.

Here, it is presumed that a stationary state where there is no motion continues over the 64 frames, and a variance $\sigma^2$ of noise of each of the 0th to 63rd input frames is all identical as shown in the following expression.

[Math. 6]
$$\sigma^2 = V(A_0) = V(A_1) = V(A_2) = \ldots = V(A_{63})$$
Expression 13

In the above expression, $A_0$ to $A_{63}$ represent all pixels of the 0th to 63rd frames. Further, V( ) is a function that returns the variance of noise of the input frame.

Further, a mean of the pixel values of all pixels of all the 0th to 63rd input frames is obtained from the following expression.

[Math. 7]
$$\bar{A} = (A_0 + A_1 + A_2 + \ldots + A_{63})/64$$
Expression 14

A variance value of noise when the mixing ratio $\alpha$ is limited is expressed by the following expression based on Expressions 13 and 14.

[Math. 8]

$$V(\bar{A}) = V((A_0 + A_1 + A_2 + \cdots + A_{63})/64)$$
$$= (V(A_0) + V(A_1) + V(A_2) + \cdots + V(A_{63}))/64$$
$$= \sigma^2/64$$

Expression 15

As shown in the above expression, the variance of noise is reduced to 1/64. Consequently, when the mixing ratio α is limited, since the proportion of the input frame is uniform, an improvement effect in an S/N ratio (Signal to Noise ratio) of approximately 18 decibels is acquired at the time 64 (=$2^6$) frames have passed. Similarly, at the time $2^{2i}$ frames (i is an integer) have passed, an improvement effect in the S/N ratio of 6×i decibels is acquired.

In contrast to this, when the mixing ratio α is not limited, since the proportion of the input frame is not made uniform, the noise reducing effect is made lower than the case where the mixing ratio α is limited. For example, at the time 64 frames have passed, an improvement effect in the S/N ratio of only 14.7 dB is expected.

Further, when the mixing ratio α is not limited, it is found that the 1st IIR coefficient $b_1$ is extraordinarily large, and the number of convergence frames until the effect imparted by the pixel value of the 1st input frame on the output frame is lost is increased. Conversely, when the mixing ratio α is limited, as exemplified in FIG. 10, an ideal IIR coefficient is applied, and the IIR converges by at most 64 frames.

As described above, according to the first embodiment of the present technology, as the number of times no motion is sequentially determined becomes larger, the imaging apparatus 100 increases the proportion of the output image to mix the input image and the output image, and thus the proportion of each input image in the output image can be made uniform. Thus, the noise within the moving image can be sufficiently reduced.

<2. Second Embodiment>

[Configuration Example of Imaging Apparatus]

In the first embodiment, the image processing section 200 detects the presence or absence of a motion of the entire screen, but a smaller unit of motion detection is desirable. An image processing section 200 of a second embodiment is different from the first embodiment in that the image processing section 200 detects both of a motion of the entire screen and a motion per pixel.

Figure 11:
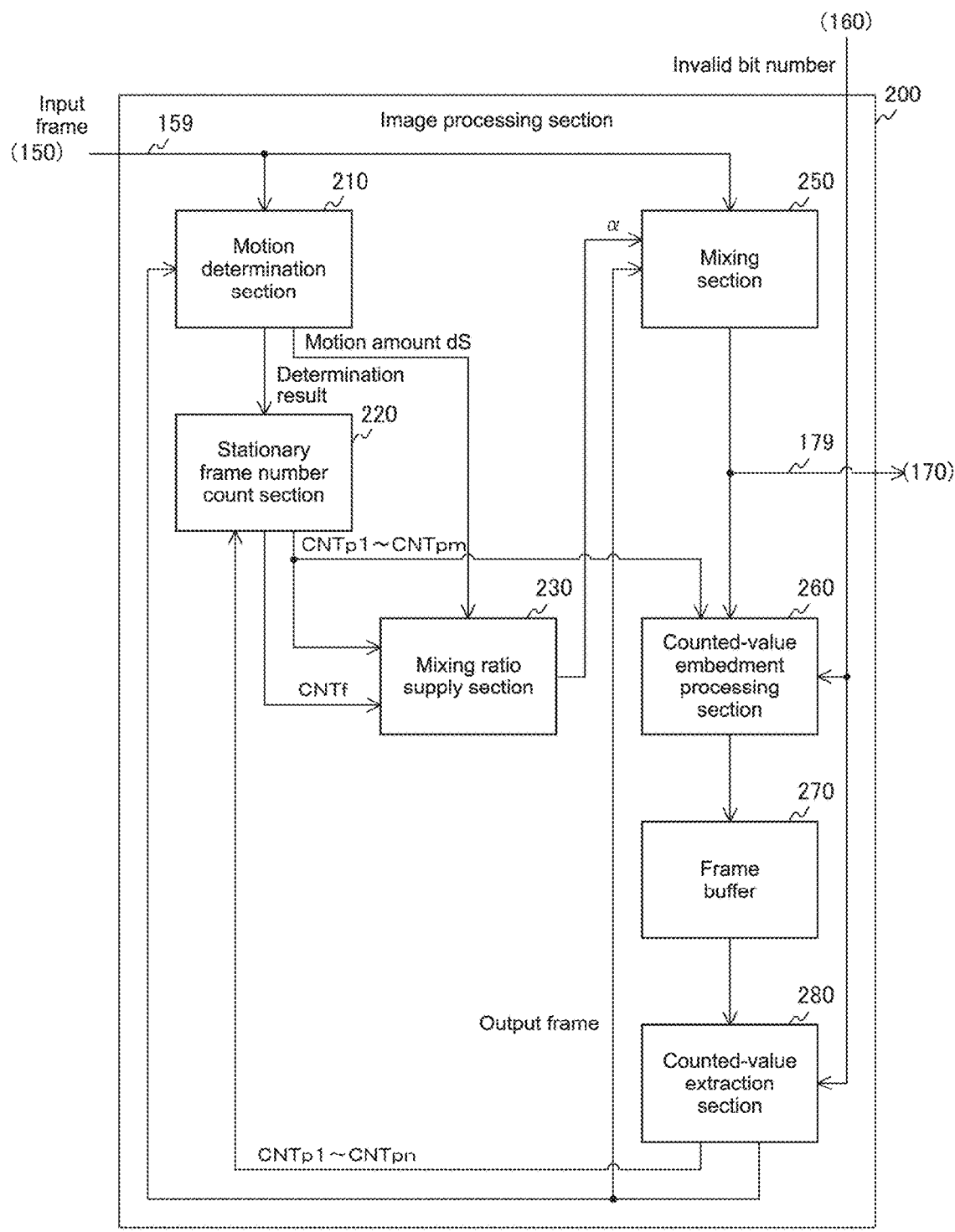
FIG. 11 is a block diagram showing a configuration example of an image processing section in a second embodiment.

FIG. 11 is a block diagram showing a configuration example of the image processing section 200 in the second embodiment. The image processing section 200 of the second embodiment is different from the first embodiment in that the image processing section 200 further includes a counted-value embedment processing section 260 and a counted-value extraction section 280.

Further, the motion determination section 210 of the second embodiment is different from the first embodiment in that the presence or absence of a motion per pixel is further detected. The stationary frame number count section 220 of the second embodiment is different from the first embodiment in that the stationary frame number count section 220 further counts, per pixel, the number of times no motion is sequentially determined. Count values CNTp1 to CNTpm of respective pixels are supplied to the mixing ratio supply section 230 and the counted-value embedment processing section 260. Here, m is an integer and indicates the total number of pixels within the frame.

The mixing ratio supply section 230 of the second embodiment is different from the first embodiment in that the mixing ratio supply section 230 generates the upper limit value L from the count value CNTf of the entire screen and the count values CNTp1 to CNTpm of the respective pixels.

The counted-value embedment processing section 260 embeds the count value per pixel into pixel data in the output frame from the mixing section 250. Specifically, the counted-value embedment processing section 260 receives an invalid bit number from the camera control section 160. The invalid bit number indicates, in the pixel data, the number of bits that do not apply to valid bits indicating pixel values. Specifically, a value corresponding to a gain in the programmable gain amplifier 150 is set. For example, when the gain is $2^x$ times or larger and is smaller than $2^{x+1}$, x bits become invalid bits.

The counted-value embedment processing section 260 replaces an invalid bit within the pixel data of a pixel corresponding to a count value with a bit indicating that count value. In other words, the counted-value embedment processing section 260 embeds the count value into the pixel data.

The counted-value embedment processing section 260 causes the frame buffer 270 to hold the output frame in which the count value is embedded.

The counted-value extraction section 280 extracts the embedded count value. The counted-value extraction section 280 reads the output frame from the frame buffer 270 and also receives the invalid bit number from the camera control section 160. The counted-value extraction section 280 extracts the count value per pixel from the output frame, based on the invalid bit number. The counted-value extraction section 280 supplies the extracted count value to the stationary frame number count section 220.

Further, the counted-value extraction section 280 replaces all the bits indicating the count values with invalid bits and supplies the output frame, which is subjected to the replacement, to the motion determination section 210 and the mixing section 250.

[Data Configuration Example of Pixel Data]

Figure 12:
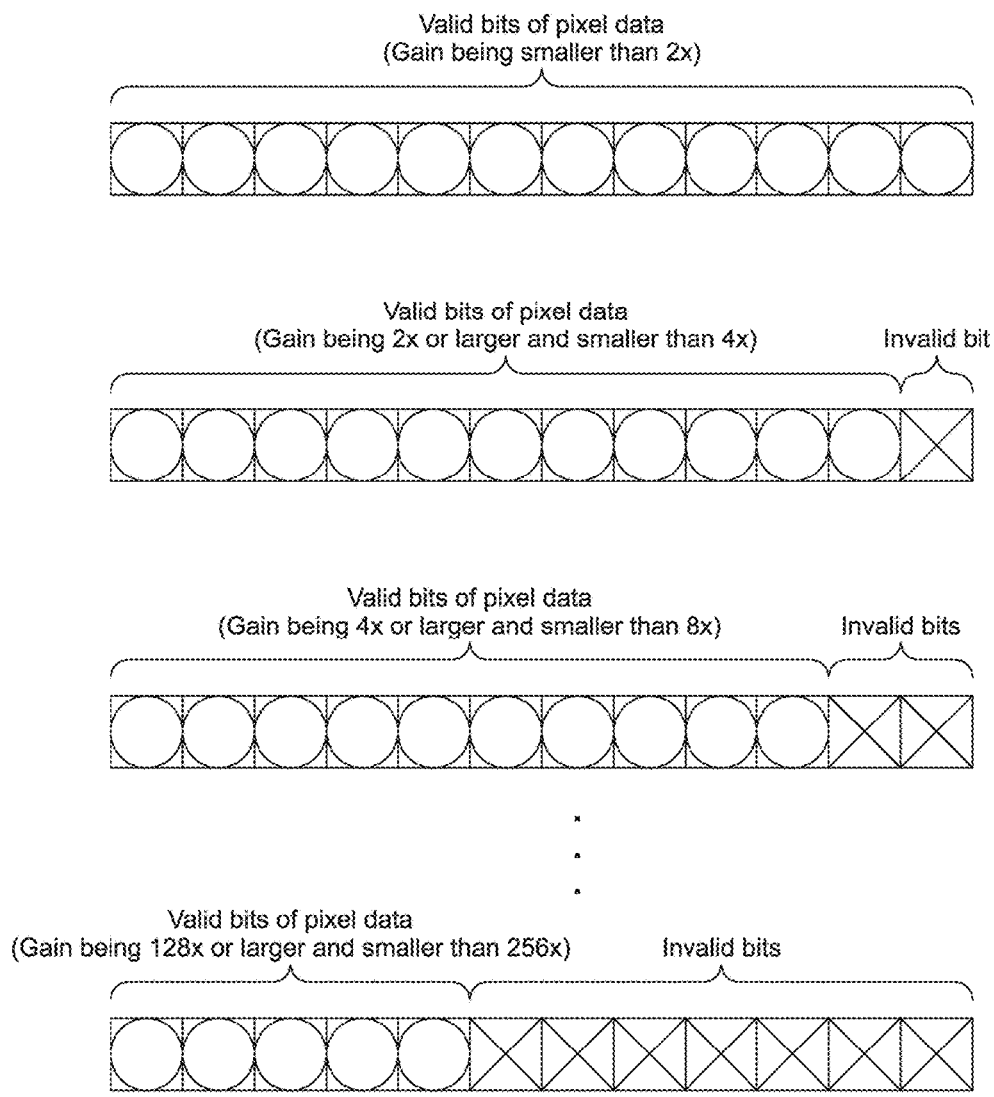
FIG. 12 is a diagram showing a data configuration example of pixel data before the embedment of the count value in the second embodiment.

FIG. 12 is a diagram showing a data configuration example of pixel data before the embedment of the count value in the second embodiment. The data size of the pixel data is 16 bits, for example. In the figure, white circles are valid bits, and crosses are bits indicating count values.

When a gain is smaller than 2×, all bits are valid in the pixel data. When a gain is 2× or larger and is smaller than 4×, one bit is an invalid bit in the pixel data. When a gain is 4× or larger and is smaller than 8×, two bits are invalid bits in the pixel data. In such a manner, as the gain becomes larger, the number of invalid bits increases.

Figure 13:
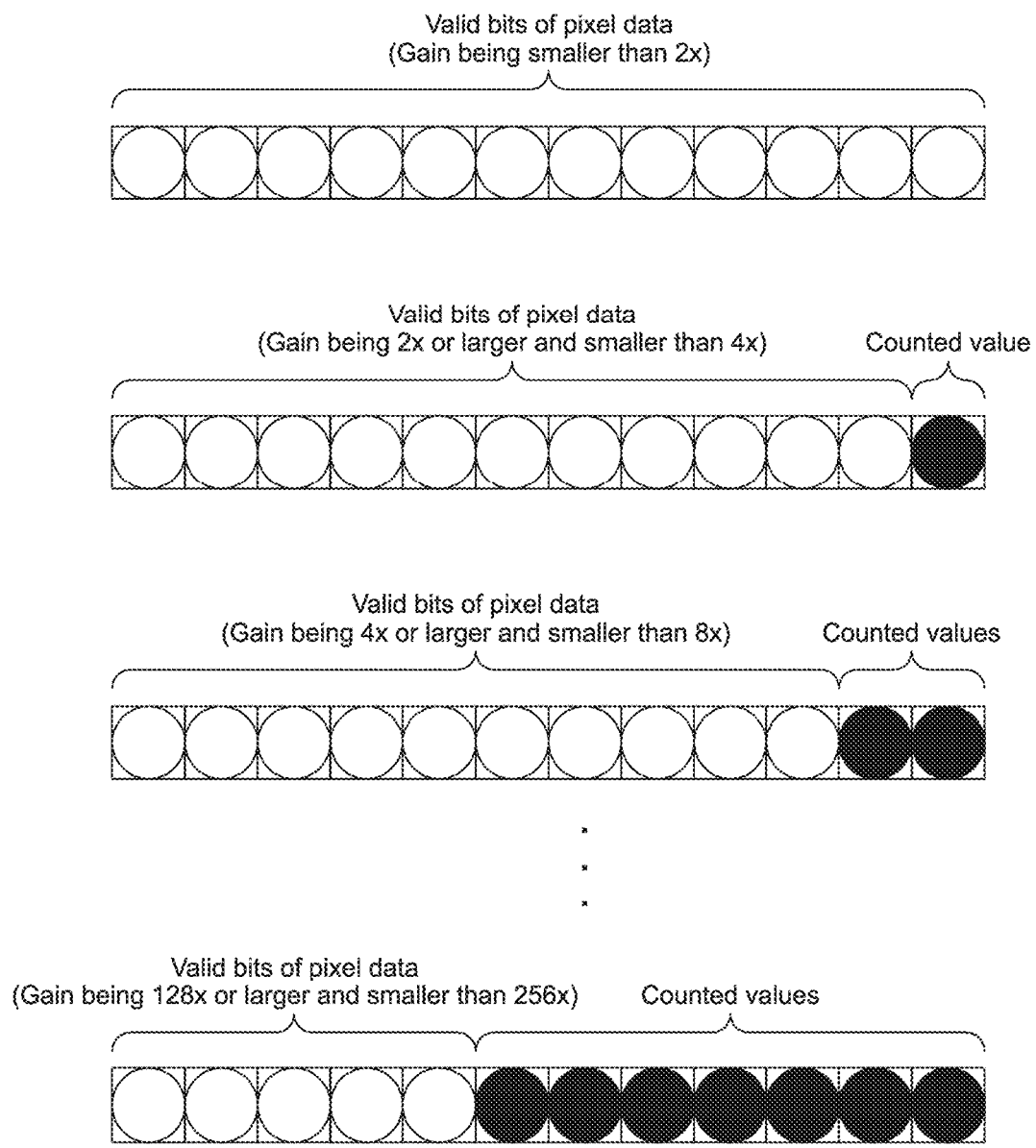
FIG. 13 is a diagram showing a data configuration example of pixel data after the embedment of the count value in the second embodiment.

FIG. 13 is a diagram showing a data configuration example of pixel data after the embedment of the count value in the second embodiment. In the figure, white circles are valid bits, and black circles are bits indicating count values.

When a gain is smaller than 2×, since all bits are valid in the pixel data, the count values cannot be embedded. When a gain is 2× or larger and is smaller than 4×, one bit is an invalid bit in the pixel data. Therefore, the count value is embedded in the one bit. When a gain is 4× or larger and is smaller than 8×, two bits are invalid bits in R data within the pixel data. Therefore, the count values are embedded in the two bits. In such a manner, as the gain becomes larger, the bit number of the embedded count values can be increased.

By the embedment of the count value in the pixel data in such a manner, it is unnecessary to prepare a memory for holding the count value per pixel. It should be noted that the image processing section 200 may be configured to further include a memory for holding a count value per pixel and hold the count value in the memory. In this configuration, it is unnecessary to perform processing of embedding the count value and processing of extracting the count value.

[Configuration Example of Motion Determination Section]

Figure 14:
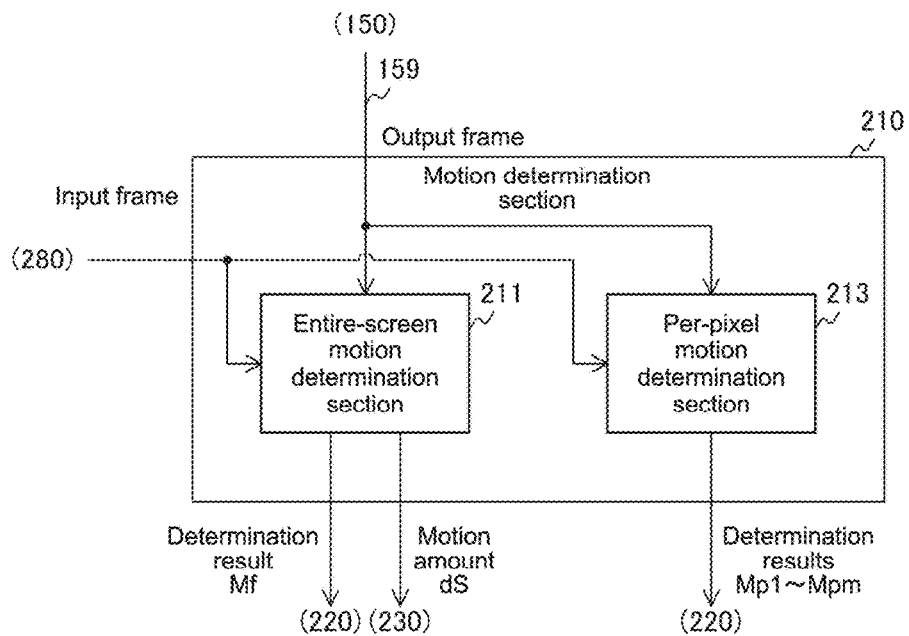
FIG. 14 is a block diagram showing a configuration example of a motion determination section in the second embodiment.

FIG. 14 is a block diagram showing a configuration example of the motion determination section 210 in the second embodiment. The motion determination section 210 includes an entire-screen motion determination section 211 and a per-pixel motion determination section 213.

The entire-screen motion determination section 211 uses an inter-frame difference method, a block matching algorithm, or the like, to determine the presence or absence of a motion on the entire screen. The entire-screen motion determination section 211 supplies the motion amount dS to the mixing ratio supply section 230 and supplies a determination result Mf on the presence or absence of a motion to the stationary frame number count section 220.

The per-pixel motion determination section 213 determines the presence or absence of a motion per pixel. The per-pixel motion determination section calculates as a motion amount of pixel an absolute value of a difference between pixel values in corresponding pixels in the input frame and the output frame. When such a motion amount is larger than a predetermined threshold value Th_p, the per-pixel motion determination section 213 determines that there is a motion in that pixel. If not, the per-pixel motion determination section 213 determines that there is no motion. The per-pixel motion determination section 213 supplies determination results Mp1 to Mpm on the presence or absence of a motion per pixel to the stationary frame number count section 220.

It should be noted that the motion determination section 210 supplies the motion amount of the entire screen to the mixing ratio supply section 230, but the motion determination section 210 is not limited to this configuration. The motion determination section 210 can also supply, as the motion amount dS, statistics of the motion amount of the entire screen and the motion amount per pixel (for example, mean value) to the mixing ratio supply section 230.

[Configuration Example of Stationary Frame Number Count Section]

Figure 15:
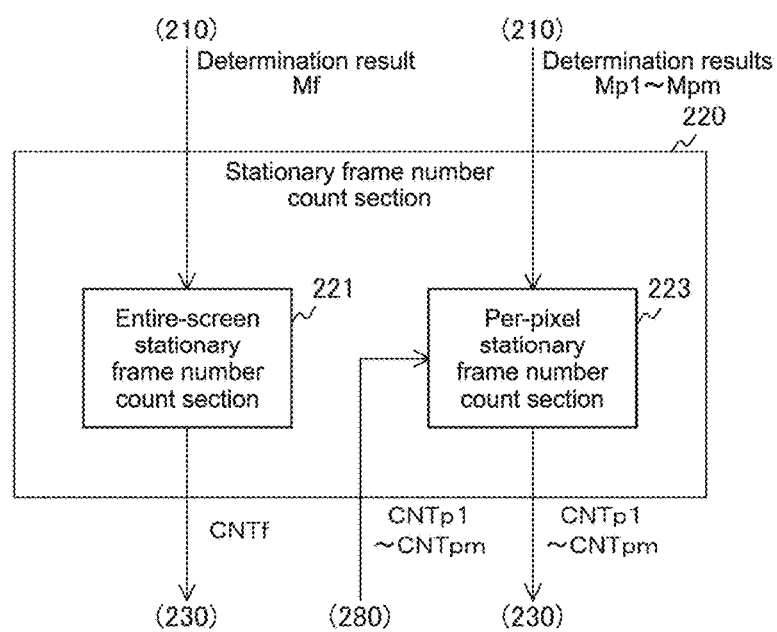
FIG. 15 is a block diagram showing a configuration example of a stationary frame number count section in the second embodiment.

FIG. 15 is a block diagram showing a configuration example of the stationary frame number count section 220 in the second embodiment. The stationary frame number count section 220 includes an entire-screen stationary frame number count section 221 and a per-pixel stationary frame number count section 223.

The entire-screen stationary frame number count section 221 counts the number of times no motion is sequentially determined on the entire screen. Specifically, the entire-screen stationary frame number count section 221 holds the count value CNTf, and when it is determined that there is a motion in the determination result Mf from the entire-screen motion determination section 211, sets the count value CNTf to be an initial value. On the other hand, when it is determined that there is no motion, the entire-screen stationary frame number count section 221 increments the count value CNTf. The entire-screen stationary frame number count section 221 then supplies the count value CNTf to the mixing ratio supply section 230.

The per-pixel stationary frame number count section 223 counts, per pixel, the number of times no motion is sequentially determined. Specifically, the per-pixel stationary frame number count section 223 receives the determination results Mp1 to Mpm from the per-pixel motion determination section 213 and receives the count values CNTp1 to CNTpm from the counted-value extraction section 280. When it is determined that there is a motion in each of the determination results, the per-pixel stationary frame number count section 223 sets a corresponding count value to be an initial value. On the other hand, when it is determined that there is no motion, the per-pixel stationary frame number count section 223 increments the corresponding count value. The per-pixel stationary frame number count section 223 then supplies the count values CNTp1 to CNTpm to the mixing ratio supply section 230.

[Configuration Example of Mixing Ratio Supply Section]

Figure 16:
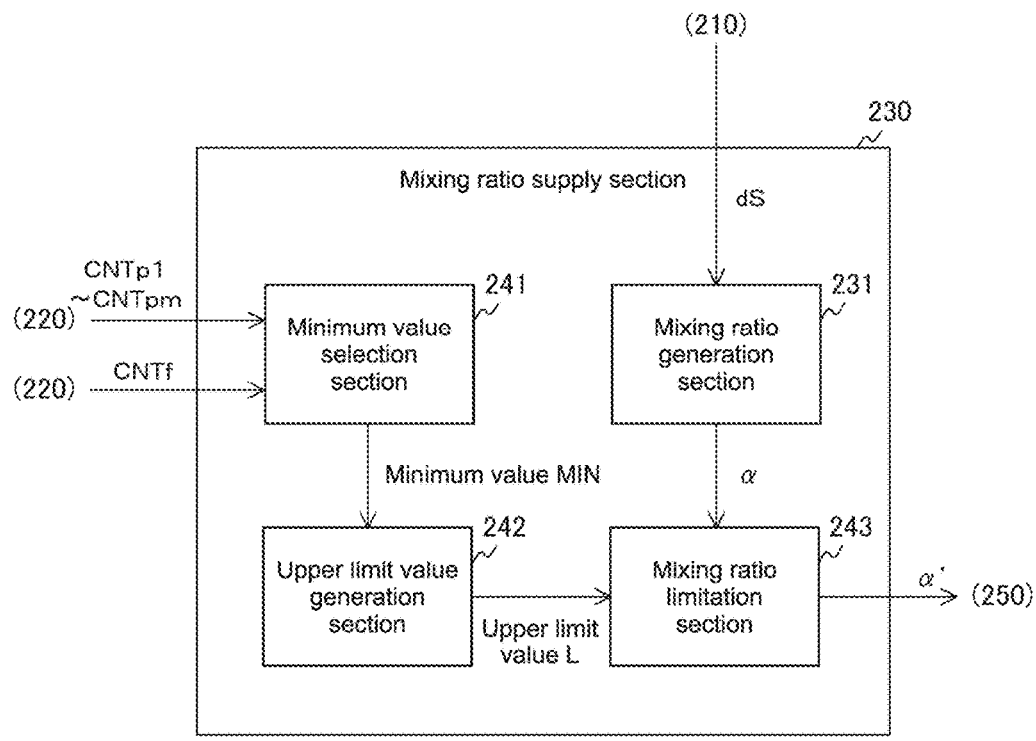
FIG. 16 is a block diagram showing a configuration example of a limitation section in the second embodiment.

FIG. 16 is a block diagram showing a configuration example of the mixing ratio supply section 230 in the second embodiment. The mixing ratio supply section 230 of the second embodiment is different from the first embodiment in that the mixing ratio supply section 230 further includes a minimum value selection section 241. The minimum value selection section 241 receives the count value CNTf and the count values CNTp1 to CNTpm from the stationary frame number count section 220. The minimum value selection section 241 supplies a minimum value MIN of those count values to the upper limit value generation section 242.

The upper limit value generation section 242 of the second embodiment calculates the upper limit value L by the following expression, using the minimum value MIN instead of the CNTf.

$$L=(MIN+1)/(MIN+2) \qquad \text{Expression 16}$$

It should be noted that the upper limit value generation section 242 can calculate the upper limit value by using the following expression instead of Expression 16.

$$L=(MIN-1)/(MIN) \qquad \text{Expression 17}$$

As described above, according to the second embodiment of the present technology, the imaging apparatus 100 detects both of a motion of the entire screen and a motion per pixel, and thus can improve detection accuracy of a motion. By improvement in detection accuracy, the frames are mixed at an appropriate mixing ratio and a noise reducing effect is improved.

<3. Third Embodiment>

[Configuration Example of Motion Determination Section]

In the second embodiment, the image processing section 200 detects the presence or absence of a motion of the entire screen as well as a motion per pixel, but a smaller unit of motion detection is desirable. An image processing section 200 of a third embodiment is different from the second embodiment in that the image processing section 200 divides a frame into a plurality of areas and detects a motion per area instead of a motion of the entire screen.

Figure 17:
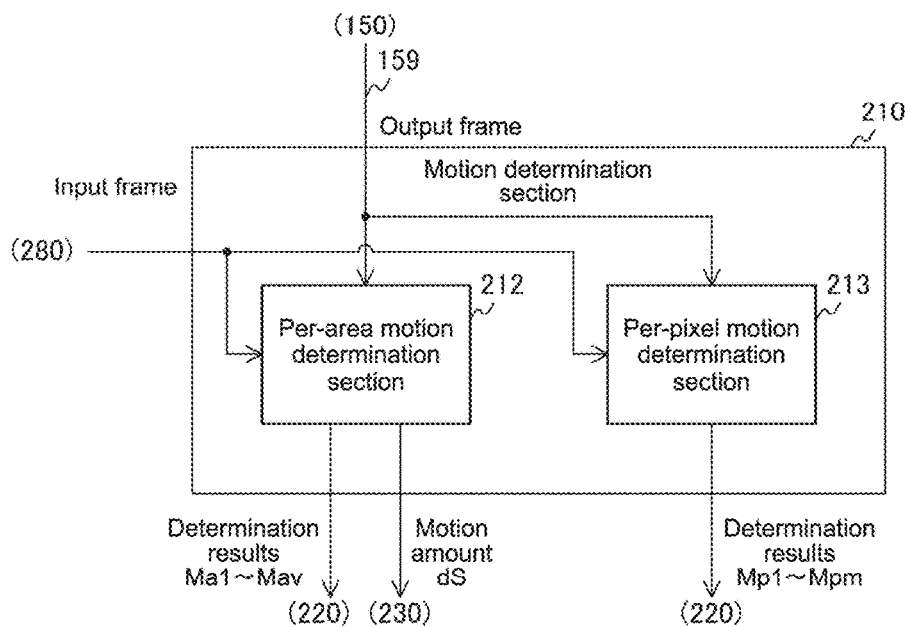
FIG. 17 is a block diagram showing a configuration example of a motion determination section in a third embodiment.

FIG. 17 is a block diagram showing a configuration example of the motion determination section 210 in the third embodiment. The motion determination section 210 of the third embodiment is different from the second embodiment in that the motion determination section 210 includes a per-area motion determination section 212 instead of the entire-screen motion determination section 211.

The per-area motion determination section 212 divides each of the input frame and the output frame into a plurality of areas and determines the presence or absence of a motion per area. Here, it is assumed that each area has a predetermined shape (for example, square of 8×8 pixels) each including a plurality of pixels.

The per-area motion determination section 212 uses a block matching algorithm, for example, to determine the presence or absence of a motion per area based on whether the motion amount dS is equal to or larger than a threshold value Th_a. In the block matching, for example, each area is seen as a block, and a motion is detected per block. The per-area motion determination section 212 supplies determination results Ma1 to Mav of respective areas to the stationary frame number count section 220. Here, v is an integer smaller than the number of pixels m and indicates the number of areas.

It should be noted that the size of the area and the size of the block are not limited to the identical size. For example, the per-area motion determination section 212 may further divide each area into a plurality of blocks and detect a motion based on a correlation of those blocks.

The configuration of the per-pixel motion determination section 213 of the third embodiment is similar to that of the second embodiment.

[Stationary Frame Number Count Section]

Figure 18:
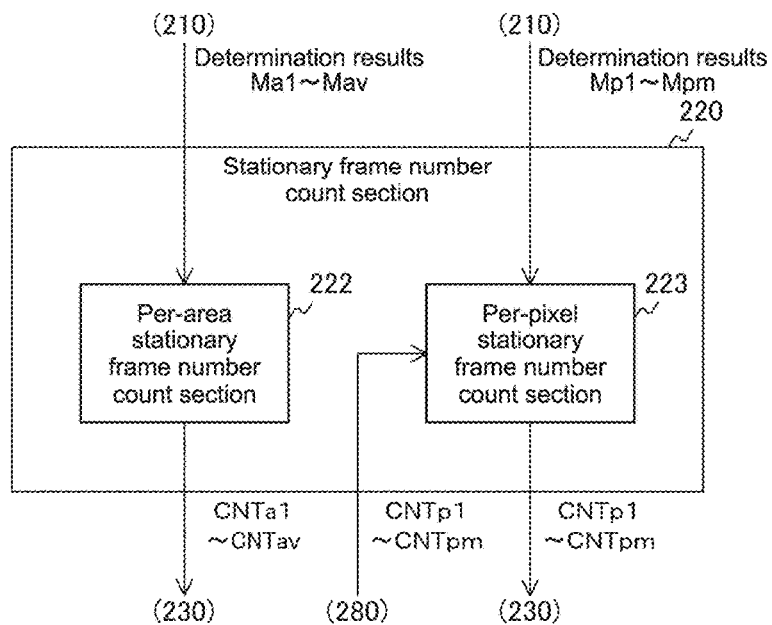
FIG. 18 is a block diagram showing a configuration example of a stationary frame number count section in the third embodiment.

FIG. 18 is a block diagram showing a configuration example of the stationary frame number count section 220 in the third embodiment. The stationary frame number count section 220 of the third embodiment is different from the second embodiment in that the stationary frame number count section 220 includes a per-area stationary frame number count section 222 instead of the entire-screen stationary frame number count section 221.

The per-area stationary frame number count section 222 counts, per area, the number of times no motion is sequentially determined. The per-area stationary frame number count section 222 holds count values CNTa1 to CNTav in v areas. The per-area stationary frame number count section 222 receives the determination results Ma1 to Mav from the per-area motion determination section 212. When it is determined that there is a motion in each of the determination results, the per-area stationary frame number count section 222 sets a corresponding count value to be an initial value. On the other hand, when it is determined that there is no motion, the per-area stationary frame number count section 222 increments the corresponding count value. The per-area stationary frame number count section 222 then supplies the count values CNTa1 to CNTav to the mixing ratio supply section 230.

The configuration of the per-pixel stationary frame number count section 223 of the third embodiment is similar to that of the second embodiment.

It should be noted that the imaging apparatus 100 detects both of a motion per area and a motion per pixel, but the imaging apparatus 100 may be configured to detect any one of those motions.

Further, the imaging apparatus 100 detects both of a motion per area and a motion per pixel, but the imaging apparatus 100 may be configured to detect both of a motion of the entire screen and a motion per area.

As described above, according to the third embodiment of the present technology, the imaging apparatus 100 detects both of a motion per area and a motion per pixel, and thus can improve detection accuracy of a motion. By improvement in detection accuracy, the frames are mixed at an appropriate mixing ratio and a noise reducing effect is improved.

<4. Fourth Embodiment>

[Configuration Example of Motion Determination Section]

In the second embodiment, the image processing section 200 detects both of a motion of the entire screen and a motion per pixel, but it is desirable to further detect a motion per area from a viewpoint of detection accuracy. An image processing section 200 of a fourth embodiment is different from the second embodiment in that the image processing section 200 further detects a motion per area in addition to a motion of the entire screen and a motion per area.

Figure 19:
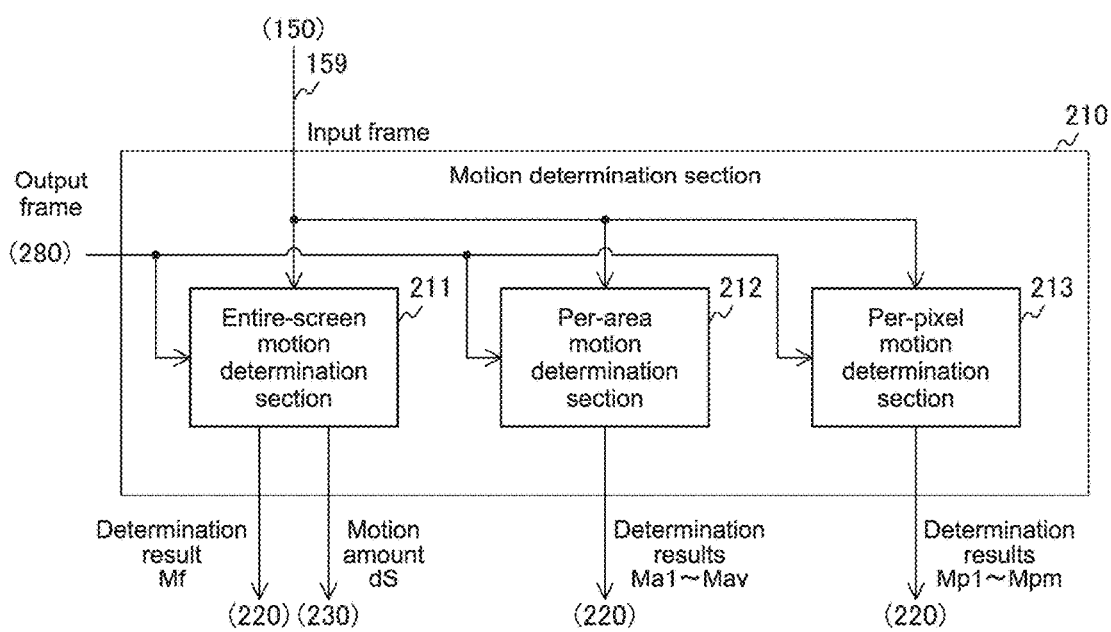
FIG. 19 is a block diagram showing a configuration example of a motion determination section in a fourth embodiment.

FIG. 19 is a block diagram showing a configuration example of the motion determination section 210 in the fourth embodiment. The motion determination section 210 of the fourth embodiment is different from the second embodiment in that the motion determination section 210 further includes a per-area motion determination section 212.

The configuration of the per-area motion determination section 212 of the fourth embodiment is similar to that of the third embodiment.

[Stationary Frame Number Count Section]

Figure 20:
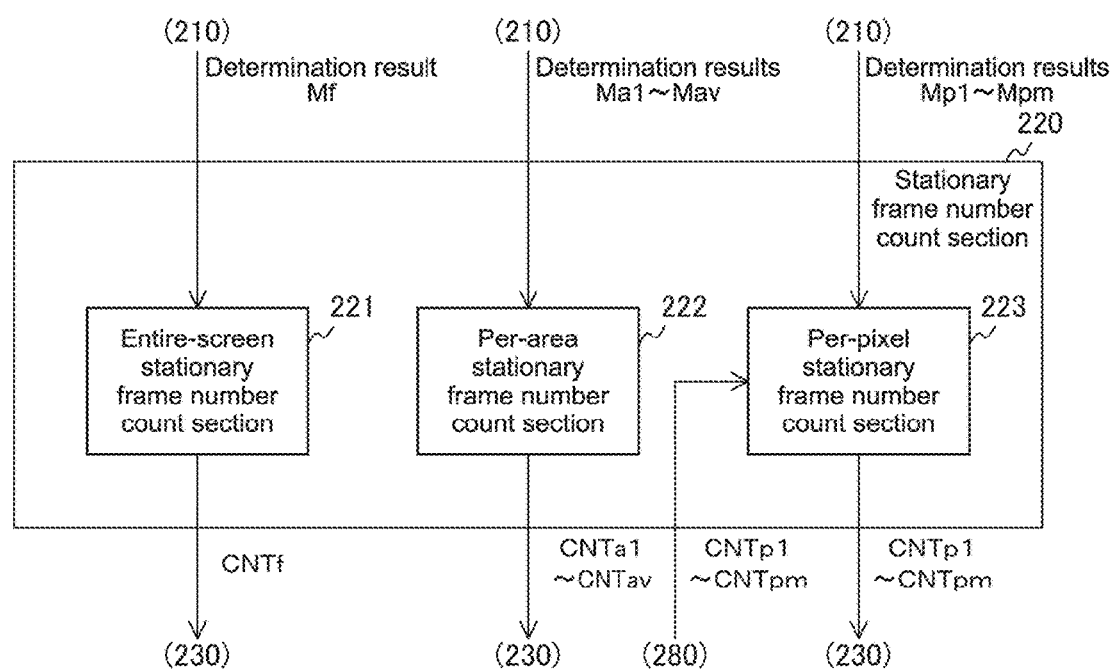
FIG. 20 is a block diagram showing a configuration example of a stationary frame number count section in the fourth embodiment.

FIG. 20 is a block diagram showing a configuration example of the stationary frame number count section 220 in the fourth embodiment. The stationary frame number count section 220 of the fourth embodiment is different from the second embodiment in that the stationary frame number count section 220 further includes a per-area stationary frame number count section 222.

The configuration of the per-area stationary frame number count section 222 of the fourth embodiment is similar to that of the third embodiment.

As described above, according to the fourth embodiment of the present technology, the imaging apparatus 100 detects all of a motion of the entire screen, a motion per area, and a motion per pixel, and thus can improve detection accuracy of a motion. By improvement in detection accuracy, the frames are mixed at an appropriate mixing ratio and a noise reducing effect is improved.

It should be noted that the embodiments described above are examples for embodying the present technology, and matters in the embodiments and matters specifying the invention in the Claims have respective correspondence relationships. Similarly, the matters specifying the invention in the Claims and matters in the embodiments of the present technology, which are denoted by names identical to the matters specifying the invention, have respective correspondence relationships. It should be noted that the present technology is not limited to the embodiments and can be embodied by variously modifying the embodiments without departing from the gist of the present technology.

Further, the processing procedures described in the above embodiments may be understood as a method including a series of those procedures. Alternatively, the processing procedures described in the above embodiments may be understood as a program for causing a computer to execute the series of procedures or as a recording medium storing that program. As the recording medium, for example, a CD (Compact Disc), an MD (Mini Disc), a DVD (Digital Versatile Disc), a memory card, a Blu-ray (registered trademark) Disc, or the like may be used.

It should be noted that the present technology can have the following configurations.

(1) An image processing apparatus, including:

a determination section that determines, each time an input image is input, whether a change amount of a pixel value distribution in the input image and an output image that is output is smaller than a predetermined threshold value;

a mixing ratio supply section that supplies a value that becomes larger as the number of times the change amount is sequentially determined to be smaller than the predetermined threshold value becomes larger, the value serving as a mixing ratio of the output image in mixing of the input image and the output image; and a mixing section that mixes, each time the input image is input, the input image and the output image based on the supplied mixing ratio and outputs the input image and the output image to serve as a new output image.

(2) The image processing apparatus according to (1), in which
the mixing ratio supply section includes
an upper limit value generation section that generates an upper limit value that becomes larger as the number of times becomes larger,
an acquisition section that acquires a value that becomes smaller as the change amount becomes larger, and
a limitation section that supplies, when the acquired value is larger than the upper limit value, the upper limit value to serve as the mixing ratio, and supplies, when the acquired value does not exceed the upper limit value, the acquired value to serve as the mixing ratio.

(3) The image processing apparatus according to (1) or (2), in which
the mixing ratio supply section supplies the mixing ratio that becomes larger as the number of times becomes larger and at which a proportion of each of the input images mixed in the output image is made uniform.

(4) The image processing apparatus according to any one of (1) to (3), in which
each of the input image and the output image is an image including a plurality of areas each including a plurality of pixels,
the determination section determines, per area, whether the change amount is smaller than the predetermined threshold value, and
the mixing ratio supply section acquires, per area, the number of times the change amount is sequentially determined to be smaller than the predetermined threshold value, and supplies the mixing ratio that becomes larger as a minimum value of the numbers of times acquired per area becomes larger.

(5) The image processing apparatus according to any one of (1) to (4), in which
each of the input image and the output image is an image including a plurality of pixels,
the determination section determines, per pixel, whether the change amount is smaller than the predetermined threshold value, and
the mixing ratio supply section acquires, per pixel, the number of times the change amount is sequentially determined to be smaller than the predetermined threshold value, and supplies the mixing ratio that becomes larger as a minimum value of the numbers of times acquired per pixel becomes larger.

(6) The image processing apparatus according to (5), further including:
a replacement section that replaces, when the pixel includes invalid data together with valid data indicating a pixel value, the invalid data not applying to the valid data, the invalid data within the pixel per pixel based on the number of times; and
an image holding section that holds the output image in which the invalid data is replaced, in which
the mixing ratio supply section acquires the number of times from the held output image.

(7) An imaging apparatus, including:
a determination section that determines, each time an input image is input, whether a change amount of a pixel value distribution in the input image and an output image that is output is smaller than a predetermined threshold value;
a mixing ratio supply section that supplies a value that becomes larger as the number of times the change amount is sequentially determined to be smaller than the predetermined threshold value becomes larger, the value serving as a mixing ratio of the output image in mixing of the input image and the output image;
a mixing section that mixes, each time the input image is input, the input image and the output image based on the supplied mixing ratio and outputs the input image and the output image to serve as a new output image; and
an image holding section that holds the output image that is output.

(8) An image processing method, including:
a determination procedure of determining, by a determination section, each time an input image is input, whether a change amount of a pixel value distribution in the input image and an output image that is output is smaller than a predetermined threshold value;
a mixing ratio supply procedure of supplying, by a mixing ratio supply section, a value that becomes larger as the number of times the change amount is sequentially determined to be smaller than the predetermined threshold value becomes larger, the value serving as a mixing ratio of the output image in mixing of the input image and the output image; and
a mixing procedure of mixing, by a mixing section, each time the input image is input, the input image and the output image based on the supplied mixing ratio and outputs the input image and the output image to serve as a new output image.

(9) A program causing a computer to execute:
a determination procedure of determining, by a determination section, each time an input image is input, whether a change amount of a pixel value distribution in the input image and an output image that is output is smaller than a predetermined threshold value;
a mixing ratio supply procedure of supplying, by a mixing ratio supply section, a value that becomes larger as the number of times the change amount is sequentially determined to be smaller than the predetermined threshold value becomes larger, the value serving as a mixing ratio of the output image in mixing of the input image and the output image; and
a mixing procedure of mixing, by a mixing section, each time the input image is input, the input image and the output image based on the supplied mixing ratio and outputs the input image and the output image to serve as a new output image.

DESCRIPTION OF REFERENCE NUMERALS

100 imaging apparatus
110 imaging lens
120 imaging device
130 analog front end
140 A/D conversion section
150 programmable gain amplifier
160 camera control section
170 D/A conversion section
180 display section
200 image processing section
210 motion determination section
211 entire-screen motion determination section
212 per-area motion determination section 213 per-pixel motion determination section
220 stationary frame number count section
221 entire-screen stationary frame number count section
222 per-area stationary frame number count section
223 per-pixel stationary frame number count section
230 mixing ratio supply section
231 mixing ratio generation section
241 minimum value selection section
242 upper limit value generation section
243 mixing ratio limitation section
250 mixing section
251 subtractor
252, 253 multiplier
254 adder
260 counted-value embedment processing section
270 frame buffer
280 counted-value extraction section

The invention claimed is:

1. An image processing apparatus to generate a moving image with reduced noise, comprising:
an image processor configured to:
determine, each time an input image is input, whether a change amount of the motion of a pixel value distribution in the input image and an output image that is output, is smaller than a predetermined threshold value;
supply a value that becomes larger as the number of times the motion change amount is sequentially determined to be smaller than the predetermined threshold value becomes larger, the value serving as a mixing ratio of the output image in mixing of the input image and the output image; and
generate a mixed noise reduced moving image by mixing the input image and the output image based on the mixing ratio;
wherein the image processor mixes, each time the input image is input, the input image and the output image based on the supplied mixing ratio and outputs the mixed noise reduced moving image.

2. The image processing apparatus according to claim 1, wherein the image processor is further configured to:
generate an upper limit value that becomes larger as the number of times becomes larger,
acquire a value that becomes smaller as the change amount becomes larger, and
supply, when the acquired value is larger than the upper limit value, the upper limit value to serve as the mixing ratio, and supply, when the acquired value does not exceed the upper limit value, the acquired value to serve as the mixing ratio.

3. The image processing apparatus according to claim 1, wherein the image processor is further configured to:
supply the mixing ratio that becomes larger as the number of times becomes larger and at which a proportion of each of the input images mixed in the output image is made uniform.

4. The image processing apparatus according to claim 1, wherein each of the input image and the output image is an image including a plurality of areas each including a plurality of pixels, and
wherein the image processor is further configured to:
determine, per area, whether the change amount is smaller than the predetermined threshold value,
acquire, per area, the number of times the change amount is sequentially determined to be smaller than the predetermined threshold value, and
supply the mixing ratio that becomes larger as a minimum value of the numbers of times acquired per area becomes larger.

5. The image processing apparatus according to claim 1, wherein
each of the input image and the output image is an image including a plurality of pixels, and
the image processor is further configured to:
determine, per pixel, whether the change amount is smaller than the predetermined threshold value,
acquire, per pixel, the number of times the change amount is sequentially determined to be smaller than the predetermined threshold value, and
supply the mixing ratio that becomes larger as a minimum value of the numbers of times acquired per pixel becomes larger.

6. The image processing apparatus according to claim 5, wherein the image processor is further configured to:
replace, when the pixel includes invalid data together with valid data indicating a pixel value, the invalid data not applying to the valid data, the invalid data within the pixel per pixel based on the number of times;
hold the output image in which the invalid data is replaced, and
acquire the number of times from the held output image.

7. An imaging apparatus to generate a moving image with reduced noise, comprising:
an image processor configured to:
determine, each time an input image is input, whether a change amount of the motion of a pixel value distribution in the input image and an output image that is output, is smaller than a predetermined threshold value;
generate a value that becomes larger as the number of times the motion change amount is sequentially determined to be smaller than the predetermined threshold value becomes larger, the value serving as a mixing ratio of the output image in mixing of the input image and the output image;
generate a mixed noise reduced moving image by mixing, each time the input image is input, the input image and the output image based on the supplied mixing ratio and outputting the mixed noise reduced moving image; and
hold the mixed noise reduced moving image.

8. An image processing method to generate a moving image with reduced noise, comprising:
a determination procedure of determining, each time an input image is input, whether a change amount of a pixel value distribution in the input image and an output image that is output is smaller than a predetermined threshold value;
a mixing ratio supply procedure of supplying, a value that becomes larger as the number of times the change amount is sequentially determined to be smaller than the predetermined threshold value becomes larger, the value serving as a mixing ratio of the output image in mixing of the input image and the output image;
a mixing procedure of mixing, each time the input image is input, the input image and the output image based on the supplied mixing ratio to generate a mixed noise reduced moving image; and
outputting the mixed noise reduced moving image.

9. A non-transitory computer-readable storage medium having instructions that, when executed by at least one computer, cause the at least one computer to execute instructions to generate a moving image with reduced noise comprising:

a determination procedure of determining, each time an input image is input, whether a change amount of a pixel value distribution in the input image and an output image that is output is smaller than a predetermined threshold value;

a mixing ratio supply procedure of supplying, a value that becomes larger as the number of times the change amount is sequentially determined to be smaller than the predetermined threshold value becomes larger, the value serving as a mixing ratio of the output image in mixing of the input image and the output image; and a mixing procedure of mixing, each time the input image is input, the input image and the output image based on the supplied mixing ratio to generate a mixed noise reduced moving image; and and output procedure of outputting the mixed noise reduced moving image.

* * * * *